US010583618B2

(12) United States Patent
Holmes

(10) Patent No.: US 10,583,618 B2
(45) Date of Patent: Mar. 10, 2020

(54) METHOD FOR PRODUCING A PATTERN IN OR ON A SUPPORT

(71) Applicant: DE LA RUE INTERNATIONAL LIMITED, Basingstoke, Hampshire (GB)

(72) Inventor: Brian William Holmes, Fleet (GB)

(73) Assignee: DE LA RUE INTERNATIONAL LIMITED, Basingstoke (GB)

(*) Notice: Subject to any disclaimer, the term of this patent is extended or adjusted under 35 U.S.C. 154(b) by 60 days.

(21) Appl. No.: 15/740,671

(22) PCT Filed: Jul. 11, 2016

(86) PCT No.: PCT/GB2016/052089
§ 371 (c)(1),
(2) Date: Dec. 28, 2017

(87) PCT Pub. No.: WO2017/009624
PCT Pub. Date: Jan. 19, 2017

(65) Prior Publication Data
US 2018/0194090 A1     Jul. 12, 2018

(30) Foreign Application Priority Data
Jul. 10, 2015   (GB) .................................. 1512121.3

(51) Int. Cl.
*B29D 11/00* (2006.01)
*B44C 1/17* (2006.01)
(Continued)

(52) U.S. Cl.
CPC ....... *B29D 11/00288* (2013.01); *B41M 3/144* (2013.01); *B44C 1/1729* (2013.01);
(Continued)

(58) Field of Classification Search
CPC .......................... B01D 24/12; B01D 24/4631; B01D 24/4869; B01D 35/12; B29D 11/00288;
(Continued)

(56) References Cited

U.S. PATENT DOCUMENTS 2,330,718 A   9/1943 Kellman
3,304,861 A   2/1967 Magid
(Continued)

FOREIGN PATENT DOCUMENTS

CN   104656167 A   5/2015
DE      3225485 A1   1/1984
(Continued)

OTHER PUBLICATIONS

English translation of JP04249189.*
English translation of CN104656167.*
English translation of DE3225485.*

*Primary Examiner* — Sonya M Sengupta
(74) *Attorney, Agent, or Firm* — Oliff PLC

(57) ABSTRACT

A method of applying a pattern formed of two different materials to a pattern support layer includes: providing a die form having a surface with recesses defining the pattern; applying a first curable material to a surface first region, received in some of the first region recesses and partially filling a first region recess set; applying a second curable material to some of the surface first region, the second curable material at least partially fills the first set of the first region recesses; contacting a pattern support layer with the die form surface to cover the recesses containing both the first and second curable materials; separating the pattern support layer from the die form surface, the first and second curable materials in the covered recesses removed therefrom and retained on the pattern support layer; and curing the first and second curable materials during and/or after the second and third steps.

28 Claims, 15 Drawing Sheets

(51) Int. Cl.
  *B41M 3/14* (2006.01)
  *B42D 25/324* (2014.01)
  *B01D 24/48* (2006.01)
  *B01D 35/12* (2006.01)
  *B01D 24/12* (2006.01)
  *B01D 24/46* (2006.01)
  *B42D 25/23* (2014.01)
  *B42D 25/24* (2014.01)
  *B42D 25/29* (2014.01)

(52) U.S. Cl.
  CPC .......... *B01D 24/12* (2013.01); *B01D 24/4631* (2013.01); *B01D 24/4869* (2013.01); *B01D 35/12* (2013.01); *B42D 25/23* (2014.10); *B42D 25/24* (2014.10); *B42D 25/29* (2014.10); *B42D 25/324* (2014.10)

(58) Field of Classification Search
  CPC ....... B41M 3/14; B41M 3/144; B44C 1/1729; B42D 25/23; B42D 25/24; B42D 25/29; B42D 25/324
  USPC .............................. 156/247, 273, 275.5, 277
  See application file for complete search history.

(56) References Cited

U.S. PATENT DOCUMENTS

| | | | | |
|---|---|---|---|---|
| 4,139,613 A | | 2/1979 | Hefele | |
| 4,856,857 A | * | 8/1989 | Takeuchi | B42D 25/324 359/3 |
| 5,318,660 A | * | 6/1994 | Olsen | B32B 37/0076 156/231 |
| 5,795,513 A | * | 8/1998 | Austin | B28B 1/005 264/71 |
| 2004/0207194 A1 | * | 10/2004 | Heim | B42D 25/355 283/82 |
| 2005/0008821 A1 | * | 1/2005 | Pricone | B29C 33/424 428/131 |
| 2005/0170259 A1 | * | 8/2005 | Holmes | G03H 1/0256 430/1 |
| 2005/0180020 A1 | * | 8/2005 | Steenblik | B42D 25/29 359/626 |
| 2009/0297805 A1 | * | 12/2009 | Dichtl | B29D 11/00365 428/211.1 |
| 2011/0209328 A1 | | 9/2011 | Steenblik et al. | |
| 2014/0087191 A1 | * | 3/2014 | Chua | H01L 21/2007 428/408 |
| 2015/0035268 A1 | * | 2/2015 | Lefebvre | B41M 3/14 283/74 |
| 2018/0154677 A1 | * | 6/2018 | Lister | B42D 25/445 |
| 2018/0194090 A1 | * | 7/2018 | Holmes | B29D 11/00288 |
| 2018/0304670 A1 | * | 10/2018 | Landertshamer | B42D 25/425 |

FOREIGN PATENT DOCUMENTS

| | | |
|---|---|---|
| EP | 2332738 A1 | 6/2011 |
| EP | 2660070 A1 | 11/2013 |
| GB | 1075724 A | 7/1967 |
| JP | H04-249189 A | 9/1992 |
| WO | 2011/102800 A1 | 8/2011 |
| WO | 2014/070079 A1 | 5/2014 |

\* cited by examiner

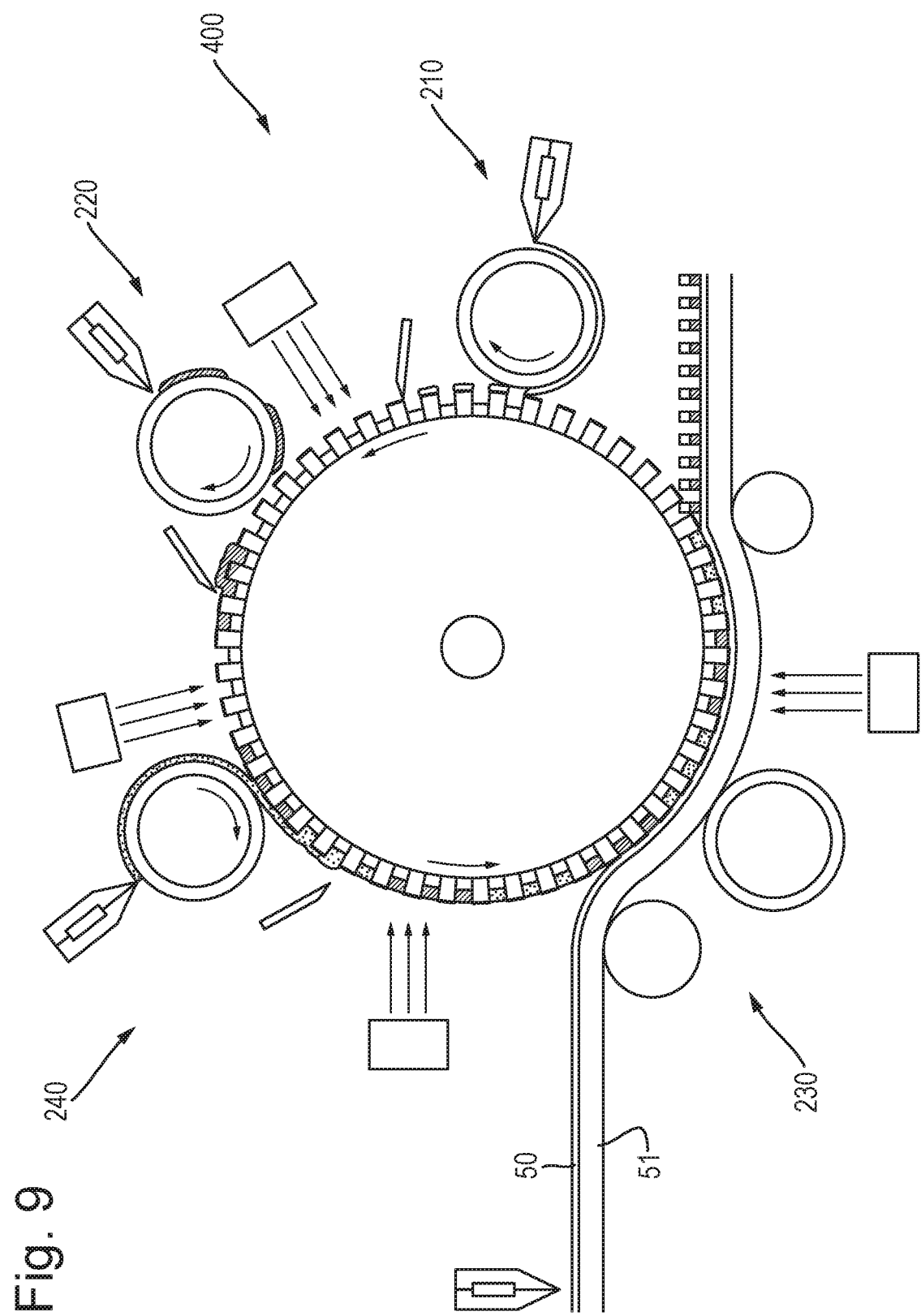

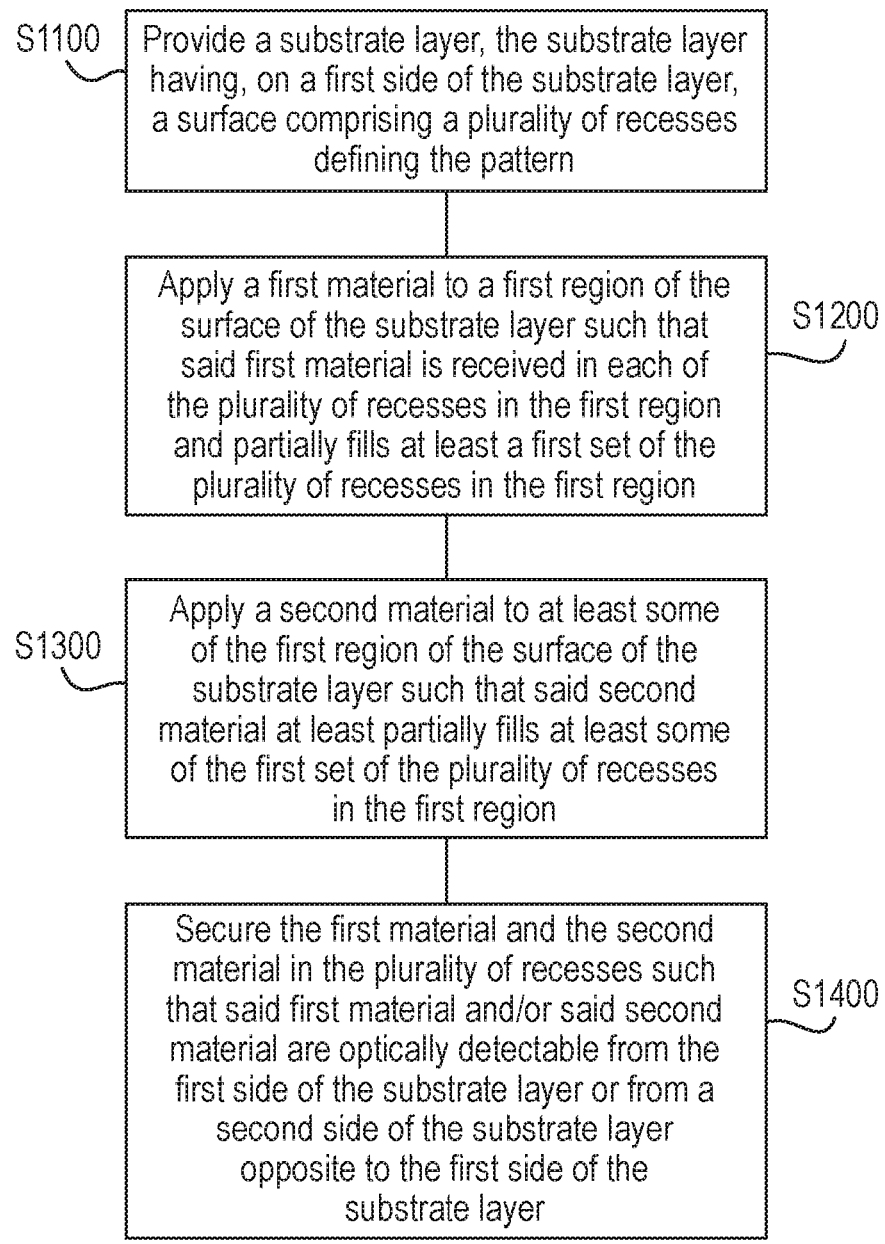

METHOD FOR PRODUCING A PATTERN IN OR ON A SUPPORT

FIELD OF THE INVENTION

The present invention is directed to a method for forming a pattern in or on a support. Such methods are used especially for the production of security elements on security documents or for later application to security documents. In particular, these security elements use patterns, especially micropatterns, to generate optical effects that are difficult to counterfeit such as lenticular effects, moiré magnification effects, and integral imaging effects.

DESCRIPTION OF THE RELATED ART

Methods are known for generating patterns or micropatterns on a substrate. US 2009/0297805 A1 and WO 2011/102800 A1 disclose methods of forming micropatterns in which a die form or matrix is provided whose surface comprises a plurality of recesses. The recesses are filled with a curable material, a treated substrate layer is made to cover the recesses of the matrix, the material is cured to fix it to the treated surface of the substrate layer, and the material is removed from the recesses by separating the substrate layer from the matrix.

Another method of forming a micropattern is disclosed in WO 2014/070079 A1. Here it is taught that a matrix is provided whose surface comprises a plurality of recesses, the recesses are filled with a curable material, and a curable pickup layer is made to cover the recesses of the matrix. The curable pickup layer and the curable material are cured, fixing them together, and the pickup later is separated from the matrix, removing the material from the recesses. The pickup layer is, at some point during or after this process, transferred onto a substrate layer so that the pattern is provided on the substrate layer.

In all of the above methods, the result is a substrate having a pattern of material formed on one surface. These patterns are suitable for use with arrays of focussing elements to produce optical effects such as lenticular effects, moiré magnification effects, and integral imaging effects. These optical effects provide a mechanism for checking the authenticity of a document, and are difficult to replicate for attempted counterfeiters.

It is a continuing objective in the art to produce security documents whose optical effects are more impressive and thereby provide a more visually striking mechanism for authentication. Improvements which make such optical effects more visually impressive will also typically make it more difficult to produce a convincing counterfeit of a security document exhibiting said optical effect. One way to make the above optical effects more visually striking is to form the pattern of multiple colours. US 2009/0297805 A1 teaches that it is possible to form a pattern of multiple colours by applying a first pattern to a substrate as taught above, and then, at a downstream location, applying a second pattern in a second colour using the same method used to apply the first pattern. A pattern formed in this way can only consist of areas of different colours laterally offset from one another and it is difficult to achieve precise register between the separately applied components of the final pattern.

It is desirable to provide new ways of forming patterns of at least two different materials in or on a substrate.

SUMMARY OF INVENTION

In accordance with a first aspect of the present invention, there is provided a method of applying a pattern formed of at least two different materials to a pattern support layer, comprising the steps of: a) providing a die form, the die form having a surface comprising a plurality of recesses defining the pattern; b) applying a first curable material to a first region of the surface of the die form such that said first curable material is received in at least some of the plurality of recesses in the first region and partially fills at least a first set of the plurality of recesses in the first region; c) applying a second curable material to at least some of the first region of the surface of the die form such that said second curable material at least partially fills at least some of the first set of the plurality of recesses in the first region; d) bringing a pattern support layer in contact with the surface of the die form such that it covers at least some of the plurality of recesses containing both the first curable material and the second curable material; and e) separating the pattern support layer from the surface of the die form such that the first curable material and the second curable material in the covered recesses is removed from said covered recesses and retained on the pattern support layer in accordance with the pattern; the method further comprising the step of curing, at least partly, the first and second curable materials, wherein the curing of the first and second curable material occurs in one or more steps during and/or after steps b) and c).

The above outlined method allows for a pattern, to be applied to a support layer, the pattern having a set of elements formed as multi-layer elements. The method comprises applying to the surface of the die form a first material to such that it leaves at least some recesses (the first set) only partially filled. This partially filled first set of recesses can then be further filled with the second material to produce the multi-layer pattern elements. In addition, the second material can be used to fill elements outside of the first region. In this way, using two materials, pattern elements having three different constructions can be formed and applied using a single die form without experiencing the difficulties found in the prior art when trying to achieve precise register between separately applied components of a final pattern.

It will be appreciated that the term "die form" is intended to cover any solid having a surface into which recesses may be incorporated in accordance with a desired pattern.

The method includes applying a first curable material to a first region of the surface of the die form such that said first curable material is received in at least some (preferably substantially all) of the plurality of recesses in the first region and partially fills at least a first set of the plurality of recesses in the first region. It will be appreciated that applying the first curable material may comprise applying the material to the surface of the die form over a continuous area such that it is received in all the recesses within that continuous area, or that applying the first curable material may comprise applying the material in accordance with a more complex design which includes one or more regions of the first material. It will also be appreciated that the first region may in fact be the entire surface of the die form.

The method also includes applying a second curable material to at least some of the first region of the surface of the die form such that said second curable material at least partially fills at least some of the first set of the plurality of recesses in the first region. Applying the second material need only comprise applying the material to the part of the region containing the partially filled recesses of the first set. The second material may be applied only to some of the partially filled recesses, or may be applied to all of the partially filled recesses. In addition, the second material may be applied over recesses already completely filled by the first material, in which case the second material will not be received in the recesses, or applied to recesses not at all filled by the first material, i.e. outside of the first region, in which case the second material may partially or completely fill these recesses outside of the first region.

Once the first and second materials are received in the recesses of the die form, a pattern support layer is brought in contact with the surface of the die form such that it covers at least some of the plurality of recesses containing both the first curable material and the second curable material. This may comprise covering all the recesses which received first and/or second material, or may comprise only covering the recesses which will create a multi-layer pattern element. The term "pattern support layer" is intended to cover any substrate suitable for removing from the recesses and retaining thereon some of the first and second curable material, which includes the pickup layers known in the art. The pattern support layer may be a single, continuous layer, either regular in shape or applied in accordance with a desired outline, or alternatively may be a layer broken up into a plurality of separate support regions and applied at a plurality of locations on the surface of the die form.

The pattern support layer is then separated from the surface of the die form. The separation of the pattern support layer may comprise peeling the pattern support layer from the surface of the die form such that the first and second material is gradually removed from the recesses across the surface of the die form, however any mechanism of separating the pattern support layer from the die form such that the first and second curable materials are removed from the recesses and retained on the pattern support layer is intended to be covered.

The method also includes curing the first and second curable materials. The curing of the first and second materials increases their viscosity, and preferably renders them substantially solid, such that they are retained on the pattern support layer in accordance with the pattern defined by the recesses of the die form. This curing of the first and second materials may occur in a single step which partially or fully cures both materials, or may involve multiple curing steps. When a single curing step is used, the first and second materials may mix together in the recesses which receive both, thereby giving the corresponding elements of the pattern different properties to elements formed only of the first or second material, or may remain separate, for example, if they are sufficiently viscous. When multiple curing steps are used, preferably the first material is partially or fully cured before the second material is applied. Subsequent curing of the second material may or may not also cure the first material.

These one or more curing steps may occur any time after application of at least one of the materials. If only one curing step is to be used, then the curing step must occur after application of both the first and second curable materials, but may occur before, during or after any of the remaining steps. Where multiple curing steps are used, they may occur in any number of steps before, during or after the steps following the application of both materials, and in addition, may include one or more curing steps for the first material before or during a subsequent application of the second material.

In preferable embodiments of the invention, the method further includes the step of: b') removing from the surface of the die form substantially all of the first curable material not in the plurality of recesses in one or more steps after step b), but before step d). Further preferably it includes the step of c') removing from the surface of the die form substantially all of the second curable material not in the plurality of recesses in one or more steps after step c), but before step d).

In these embodiments, excess material is removed from the surface of the die form following the application of the first and/or second curable materials. It will be appreciated that in applying material to the surface of the die form, it is likely that not all of the material will be received in the recesses, and it will therefore be desirable to remove this extra material. Removal of the material not in the recesses may be performed in one or more steps after application of at least one of the materials, and may be performed before, during or after curing of the material. Removing the excess material may be performed, for example, by a doctoring blade or doctoring surface, such as a sacrificial web or cleaning roller.

As hinted to above, preferably curing, at least partly, the first and second curable materials comprises: b") curing, at least partly, the first curable material after step b), but before step c); and c") curing, at least partly, the second curable material after step c), but before step d). This prevents mixing of the materials, and ensures that the multi-layer elements of the pattern are well defined.

In particularly preferable embodiments, the die form is a substantially cylindrical roller. In these embodiments, the recesses are formed in the surface of the cylindrical roller or in a plate attached to a cylindrical roller. Typically, in embodiments that feature a die form in the form of a cylindrical roller, the materials will be applied to the surface of the roller as the roller rotates, with the rotation of the roller being used to then bring the filled recesses in contact with the pattern support layer and then separate the surface of the die form from the pattern support layer such that the material is removed from the recesses and retained on the pattern support layer in accordance with the method. While a cylindrical roller is preferable, other embodiments are foreseen in which the die form is a substantially flat, or curved plate, or is provided in the form of a continuous track.

In particularly preferable embodiments, steps b) and c) comprise, in order:
b) applying a first curable material to a first region of the surface of the die form such that said first curable material is received in at least some of the plurality of recesses in the first region and partially fills at least a first set of the plurality of recesses in the first region; b') removing from the surface of the die form substantially all of the first curable material not in the plurality of recesses; b") curing, at least partly, the first curable material; c) applying a second curable material to at least some of the first region of the surface of the die form such that said second curable material at least partially fills at least some of the first set of the plurality of recesses in the first region; c') removing from the surface of the die form substantially all of the second curable material not in the plurality of recesses; and c") curing, at least partly, the second curable material. Applying a first material, removing excess, then curing before repeating for a second material has been found to be a particularly preferable way of applying material to the die form. By curing before application of a second material, the mixing of the materials is reduced or prevented resulting in a particularly good final pattern. While it is preferable that material is removed before curing in the above, it is also possible that the first material is cured and then excess removed before the same is done for the second material.

Further, it is preferable that the first curable material is applied to the surface of the die form by a first curable material application system, and the second curable material is applied to the surface of the die form by a second curable material application system. While preferable, it is possible that both materials could be applied sequentially by a single material application system. Preferably, the first material application system comprises a first patterned material carrier (such as a patterned roller), wherein the surface of the first patterned material carrier has first and second sub-areas, the characteristics of the surface of the first patterned material carrier being different in the first and second sub-areas, and the first patterned material carrier applies the first curable material to the surface of the die form in accordance with the first sub-area of the surface of the first patterned material carrier. The second material application system may be similarly constructed, i.e. may comprise a second patterned material carrier with first and second sub-areas having different characteristics, or alternatively may apply the second material all over the die form.

In the above embodiments preferably the first and/or second curable materials are applied using flexographic printing, gravure printing, lithographic printing, offset gravure printing, and/or offset lithographic printing.

In some embodiments, the first curable material only partially fills all of the plurality of recesses in the first region. In these embodiments, all of the recesses which receive the first material may then receive additional material. In one example, the recesses in the first region may all be partially filled with the first material, and subsequently, these recesses may further be filled with the second material. As will be described further below, these embodiments may have a first appearance from a first side, when the first material is visible, and a second appearance from a second side, when the second material is visible. In a different example, some of the recesses which received the first material may receive a second material, while the others which received the first material receive a third material.

In a particularly preferable embodiment, a first sub-group of the plurality of recesses have a first depth, and a second sub-group of the plurality of recesses have a second depth, greater than the first depth. In these embodiments, it is preferable that the first curable material partially or substantially fills the plurality of recesses of the first sub-group in the first region, and partially fills the plurality of recesses of the second sub-group in the first region, and wherein the second curable material at least partially fills at least some of the plurality of recesses of the second sub-group in the first region and substantially does not fill the plurality of recesses of the first sub-group in the first region. In these embodiments, the first material may, for example, be applied to the surface of the die form in a layer of substantially constant thickness which is equal to the depth of the first sub-group of recesses, and, for example, equal to half the depth of the second sub-group of recesses, in which case, the second sub-group will be the "first set". The second material may then be applied all over the first region, and will only be received in the second sub-group of recesses (the first set), as the first sub-group of recesses will be substantially filled by the first material. In this way, the depth of the recesses selects what material(s) it receives. This can allow for the properties of each single element of the pattern to be configured on an individual scale. As will be described further below, this can allow for control of the appearance (e.g. colour) of each single element without the need for precise application of material across the surface of the die form.

This teaching can be taken beyond the application of two materials. In some embodiments, a third sub-group of the plurality of recesses have a third depth, greater than the second depth. As alluded to above, some embodiments further comprising the step: f) applying a third curable material to the surface of the die form such that said third curable material at least partially fills at least some of the first set of the plurality of recesses in the first region, wherein step f) is performed after step c) or before step c) but after step b). In embodiments comprising a three sub-groups of recesses and application of three materials, preferably the first curable material partially fills the plurality of recesses of the third sub-group in the first region, and the second curable material partially fills at least some of the plurality of recesses of the third subgroup in the first region, and the third curable material at least partially fills at least some of the plurality of recesses of the third sub-group in the first region partially filled by both the first and second curable materials, and substantially does not fill the plurality of recesses of the first sub-group in the first region, and substantially does not fill the plurality of recesses of the second sub-group in the first region filled by both the first and second curable materials. In these embodiments, again, the depth of the recesses determine the structure of the elements of the pattern. For example, the first sup-group may receive only the first material, the second subgroup may receive the first followed by the second material, and the third sub-group may receive the first material, followed by the second material, and followed by the third material.

Preferably, at least one of the plurality of recesses has a width of less than 50 μm, preferably less than 10 μm, more preferably less than 5 μm, and most preferably between about 1 to 3 μm. It will be understood that the width of recess is intended to mean the distance across the opening in the surface of the die form. For example, where the recess is a straight line trench, the width is the dimension of the opening in the surface of the die form in a direction perpendicular to its length, and where the recess is in the form of an alphanumeric character, the width is the line width of the typeface. Preferably the recesses have similar dimensions for depth.

Preferably, the plurality of recesses define an image element pattern or a microimage element pattern and in embodiments in which the plurality of recesses define the microimage element pattern, preferably each of the plurality of recesses or a group of the plurality of recesses corresponds to a microimage element of the microimage element pattern. Image element patterns and microimage element patterns are patterns particularly suited to generating optical effects such as lenticular effects, moiré magnification effects, and integral imaging effects. For example, an image element pattern may be an arrangement of substantially parallel, spaced apart, straight stripes intended to collectively form a first image in a lenticular device. Alternatively, for example, a microimage element pattern may be an arrangement of microimage elements in the form of identical icons that are intended to form a magnified version of the icon when moiré magnification is implemented.

In some embodiments, the pattern support layer is substantially transparent or translucent. This is particularly preferable as it allows the multi-layer pattern to be viewed from either side of the pattern support layer which can, for example, allow the pattern to be used to generate optical effects from both sides of a security element. As mentioned above, in embodiments in which the first material partially fills all recesses, which are further filled by the second material, the pattern may appear a first colour from a first side of the pattern support layer and a second colour from a second side of the pattern support layer. Alternatively, in embodiments featuring different recess depths, two or more different colours may be visible from a first side, and only a first colour visible from a second side.

Preferably, the pattern support layer is a curable pattern support layer, and wherein the method further comprises curing, at least partly, the curable pattern support layer in one or more steps after step d). By providing that the pattern support layer is curable, both the material forming the pattern and the material supporting the pattern can be cured to produce a firm bond between the two. While it is preferable that the pattern support layer is curable, it is foreseen that embodiments will exist in which adhesion between a pattern support layer and the first and second materials facilitates the removal of the first and second materials from the recesses of the die form and their retention on the pattern support layer.

As with the first and second curable materials, when a curable pattern support layer is provided, curing of the pattern support layer can be performed in one or more curing steps, and at any point after it is brought into contact with the surface of the die form, but preferably, at least one curing step occurs before separation of the pattern support layer from the surface of the die form to facilitate removal of the first and second curable materials from the recesses. Further preferably, curing, at least partly, the curable pattern support layer also cures, at least partly, at least one of the first curable material and the second curable material. However, alternatively, the first and second curable materials may already be fully cured when the pattern support layer is cured.

In some embodiments, step d) further comprises pressing the pattern support layer against the surface of the die form. Pressing the pattern support layer against the surface of the die form allows the pattern support layer to get a good anchor on the first and second curable material which facilitates removal of the first and second curable material from the recesses of the die form. In particularly preferable embodiments, pressing of the pattern support layer against the surface of the die form is performed by a backing roller and/or an impression roller. Use of a backing roller and/or impression roller is particularly preferable when the die form is a substantially cylindrical roller, as described above.

As mentioned above, it is preferable that the first curable material has a first set of optical properties, and the second curable material has a second set of optical properties different from the first set of optical properties so that the differences between the materials are optically detectable. In particular, it is preferable that the first curable material appears a first colour when viewed on the pattern support layer in reflected light and/or transmitted light, and the second curable material appears a second colour when viewed on the pattern support layer in reflected light and/or transmitted light. It has been described above, that by providing materials of different colours, the pattern may be configured to have elements which appear different colours. If the first and second materials are substantially opaque, only the uppermost material will be visible when viewed from any one side. If the first and second materials are coloured, translucent materials, when viewed, for example in transmission, the colours of the materials may combine for the elements which comprise more than one material.

Preferably, the first curable material and/or the second curable material are resins and/or inks, and/or comprise luminescent, phosphorescent, fluorescent, magnetic, thermochromic, photochromic, iridescent, metallic, optically variable and/or pearlescent pigments. While preferable, any curable material could be used, such as a thermally-curable resin or lacquer. However, preferably, the curable material is a radiation curable material, preferably a UV curable material. UV curable polymers employing free radical or cationic UV polymerisation are suitable for use as the UV curable material. Examples of free radical systems include photocrosslinkable acrylate-methacrylate or aromatic vinyl oligomeric resins. Examples of cationic systems include cycloaliphatic epoxides. Hybrid polymer systems can also be employed combining both free radical and cationic UV polymerization. Electron beam curable materials would also be appropriate for use in the presently disclosed methods. Electron beam formulations are similar to UV free radical systems but do not require the presence of free radicals to initiate the curing process. Instead the curing process is initiated by high energy electrons.

Preferably the finished pattern is visible (optionally after magnification) to the human eye and so advantageously the curable material comprises at least one colourant which is visible under illumination within the visible spectrum. For instance, the material may carry a coloured tint or may be opaque. The colour will be provided by one or more pigments or dyes as is known in the art. Additionally or alternatively, the curable material may comprise at least one substance which is not visible under illumination within the visible spectrum and emits in the visible spectrum under non-visible illumination, preferably UV or IR.

In some embodiments, curing at least one of the first curable material, the second curable material and, if provided, the third curable material and, if provided, the curable pattern support layer comprises curing by exposure to radiation, and preferably by exposure to UV radiation.

In some embodiments, there is further included the step of: d') bringing a substrate layer in contact with a first side of the pattern support layer, either before, during or after step d), the pattern support layer being retained on the substrate layer; wherein the first curable material and second curable material are retained on a second side of the pattern support layer, the second side of the pattern support layer being opposite the first side of the pattern support layer. This is particularly preferable for embodiments in which the pattern support layer does not have characteristics that would allow it to be used as a security document substrate. For example, the pattern support layer may be selected for characteristics which facilitate its anchoring to the first and second curable materials for removal of said first and second curable materials. In which case, the pattern support layer may be applied to a substrate layer, where the substrate layer is selected, for example, to be suitable for use as the bulk substrate layer in a polymer bank note. It will be appreciated that the substrate layer may be brought into contact with the pattern support layer before, the pattern support layer is brought into contact with the surface of the die form, during this process of bringing the pattern support layer into contact with surface of the die form, and before, during or after the separation of the pattern support layer from the surface of the die form.

In embodiments which comprise the step of bringing a substrate layer in contact with a first side of the pattern support layer, preferably, the substrate layer is a pre-primed substrate layer. It will be understood that a pre-primed substrate layer is a substrate layer in which the surface has been treated in some way to promote bonding of the substrate layer with the pattern support layer such that the pattern support layer is firmly retained on the substrate layer.

In some embodiments the pattern support layer is a substrate layer suitable for use as a security document substrate. In these embodiments, the pattern support layer is selected to have characteristics which make it suitable for removing the first and second curable materials from the recesses in the surface of the die form, and for example, for acting as the bulk substrate layer in a polymer bank note.

Preferably, the pattern support layer is a continuous web and/or if provided, the substrate layer is a continuous web. Security documents, or security elements suitable for incorporation into security documents, are generally produced in the form of a continuous web for at least some portion of their manufacture. It is therefore preferable that the application of the pattern according to this method is also performed on a continuous web of pattern support layer. These embodiments are particularly preferable when the die form is provided in the form of a substantially cylindrical roller.

When, for example, the die form is provided in the form of a substantially cylindrical roller, another way of continuously providing pattern support layer is to provide that the pattern support layer is a material substantially continuously applied to the surface of the die form. This may be, for example, a clear tie coat layer that is applied by tie coat application means to the surface of the die form in a continuous manner.

Similarly, it is preferable that the first curable material and/or the second curable material are substantially continuously applied to the surface of the die form. While preferable, it is also possible that the first and second curable material could be applied to the surface of the die form until it is covered, before stopping applying curable material until all of the curable material has been transferred to the pattern support layer in accordance with the rest of the method.

In accordance with a second aspect of the present invention, there is provided a method of forming a pattern of at least two different materials in a substrate layer, comprising the steps of: a) providing a substrate layer, the substrate layer having, on a first side of the substrate layer, a surface comprising a plurality of recesses defining the pattern; b) applying a first material to a first region of the surface of the substrate layer such that said first material is received in at least some (preferably substantially all) of the plurality of recesses in the first region and partially fills at least a first set of the plurality of recesses in the first region; c) applying a second material to at least some of the first region of the surface of the substrate layer such that said second material at least partially fills at least some of the first set of the plurality of recesses in the first region; d) securing the first material and the second material in the plurality of recesses such that said first material and/or said second material are optically detectable from the first side of the substrate layer or from a second side of the substrate layer opposite to the first side of the substrate layer.

The above outlined method allows for a multi-layered pattern to be formed in a substrate. This represents an alternative to the first aspect of the present invention for providing a multi-layered pattern for use in generating optical effects such as lenticular effects, moiré magnification effects, and integral imaging effects.

The method includes applying a first material to a first region of the surface of the substrate layer such that said first material is received in at least some of the plurality of recesses in the first region and partially fills at least a first set of the plurality of recesses in the first region. It will be appreciated that applying the first material may comprise applying the material to the surface of the substrate layer over a continuous area such that it is received in all the recesses within that continuous area, or that applying the first material may comprise applying the material in accordance with a more complex design which includes one or more regions of the first material.

The method also includes applying a second material to at least some of the first region of the surface of the substrate layer such that said second material at least partially fills at least some of the first set of the plurality of recesses in the first region. Applying the second material need only comprise applying the material to the part of the region containing the partially filled recesses of the first set. The second material may be applied only to some of the partially filled recesses, or may be applied to all of the partially filled recesses. In addition, the second material may be applied over recesses already completely filled by the first material, in which case the second material will not be received in the recesses, or applied to recesses not at all filled by the first material, i.e. outside of the first region, in which case the second material may partially or completely fill these recesses outside of the first region.

The method finally includes securing the first material and the second material in the plurality of recesses such that said first material and/or said second material are optically detectable from the first side of the substrate layer or from a second side of the substrate layer opposite to the first side of the substrate layer. This is intended to cover any means of securing the materials in the recesses which still permits the optical detection of the pattern.

In some embodiments, the first material and/or the second material are curable, and securing the first material and the second material in the plurality of recesses comprises curing, at least partially, the first material and/or curing, at least partially, the second material in one or more steps during or after step b).

It will be appreciated that curing both of the first and second materials may secure the materials in the recesses and allow for the pattern to be visible when viewing the substrate layer from the side in which the recesses are formed. In practice, this visible pattern could be used to generate a lenticular effect, moiré magnification effect, or integral imaging effect by arranging an appropriate series of lenses over the pattern in a way well known in the art. It will also be appreciated, that, as in the first aspect, this curing of the first and/or second materials may occur in a single step which partially or fully cures either or both materials, or may involve multiple curing steps.

In some embodiments securing the first material and the second material in the plurality of recesses comprises applying a sealing layer to the first side of the substrate layer such that it covers the plurality of recesses. It will be appreciated that securing the materials using a sealing layer may be in addition to or instead of curing one or more of the materials. It should also be appreciated that a sealing layer is considered to be any layer which covers the recesses and keeps the cured or uncured material in the recesses.

Preferably, either or both of the substrate layer and the sealing layer are substantially transparent or translucent such that the first material and the second material are optically detectable through said substantially transparent or translucent substrate layer and/or sealing layer. It will be appreciated that providing that at least one of these layers is transparent or translucent is a preferable means of ensuring that the first and second materials are optically detectable from the first or second sides of the substrate layer. In these embodiments, the transparent or translucent substrate layer or sealing layer may be used as an optical spacer for a set of focussing devices, such as lenses, used to generate a lenticular effect, moiré magnification effect, or integral imaging effect.

In some embodiments the method further comprises the step of: b') removing from the surface of the substrate layer substantially all of the first material not in the plurality of recesses in one or more steps after step b), but before step d). Further preferably the method comprises the step of: c') removing from the surface of the substrate layer substantially all of the second material not in the plurality of recesses in one or more steps after step c), but before step d). It will be appreciated that in applying material to the surface of the substrate layer, it is likely that not all of the material will be received in the recesses, and it will therefore be desirable to remove this extra material. Removal of the material not in the recesses may be performed in one or more steps after application of at least one of the materials, and may be performed before, during or after curing of the material, if the material is to be cured. Removing the excess material may be performed, for example, by a doctoring blade or doctoring surface, such as a sacrificial web or cleaning roller.

In particularly preferable embodiments, steps b) and c) comprise, in order: b) applying a first material to a first region of the surface of the substrate layer such that said first material is received in at least some of the plurality of recesses in the first region and partially fills at least a first set of the plurality of recesses in the first region; b') removing from the surface of the substrate layer substantially all of the first material not in the plurality of recesses; c) applying a second material to at least some of the first region of the surface of the substrate layer such that said second material at least partially fills at least some of the first set of the plurality of recesses in the first region; and c') removing from the surface of the substrate layer substantially all of the second material not in the plurality of recesses. Applying a first material, removing excess, then curing before repeating for a second material has been found to be a particularly preferable way of applying material directly to the substrate layer. By curing before application of a second material, the mixing of the materials is reduced or prevented resulting in a particularly good final multi-material pattern. While it is preferable that material is removed before curing in the above, it is also possible that the first material is cured and then excess removed before the same is done for the second material.

Preferably, the first material is applied to the surface of substrate layer by a first material application system, and wherein the second material is applied to the surface of the substrate layer by a second material application system. In some embodiments, the first material application system comprises a first patterned material carrier, wherein the surface of the first patterned material carrier has first and second sub-areas, the characteristics of the surface of the first patterned material carrier being different in the first and second sub-areas, and the first patterned material carrier applies the first material to the surface of the substrate layer in accordance with the first sub-area of the surface of the first patterned material carrier. The second material application system may be similarly constructed, i.e. may comprise a second patterned material carrier with first and second sub-areas having different characteristics, or alternatively may apply the second material all over the substrate.

In the above embodiments, preferably the first and/or second materials are applied using flexographic printing, gravure printing, lithographic printing, offset gravure printing, and/or offset lithographic printing.

In some embodiments, the first material only partially fills all of the plurality of recesses in the first region. In these embodiments, all of the recesses which receive the first material may then receive additional material. In one example, the recesses in the first region may all be partially filled with the first material, and subsequently, these recesses may further be filled with the second material.

In a particularly preferable embodiment, a first sub-group of the plurality of recesses have a first depth, and a second sub-group of the plurality of recesses have a second depth, greater than the first depth. In these embodiments, it is preferable that the first material partially or substantially fills the plurality of recesses of the first sub-group in the first region, and partially fills the plurality of recesses of the second sub-group in the first region, and wherein the second material at least partially fills at least some of the plurality of recesses of the second sub-group in the first region and substantially does not fill the plurality of recesses of the first sub-group in the first region. In these embodiments, the first material may, for example, be applied to the surface of the substrate layer in a layer of substantially constant thickness which is equal to the depth of the first sub-group of recesses, and, for example, equal to half the depth of the second sub-group of recesses, in which case, the second sub-group will be the "first set". The second material may then be applied all over the first region, and will only be received in the second sub-group of recesses (the first set), as the first sub-group of recesses will be substantially filled by the first material. In this way, the depth of the recesses selects what material(s) it receives. This can allow for the properties of each single element of the pattern to be configured on an individual scale. This can allow for control of the appearance (e.g. colour) of each single element without the need for precise application of material across the surface of the substrate layer.

In some embodiments, a third sub-group of the plurality of recesses have a third depth, greater than the second depth. As alluded to above, some embodiments further comprising the step: f) applying a third material to the surface of the substrate layer such that said third material at least partially fills at least some of the first set of the plurality of recesses in the first region, wherein step e) is performed after step c) or before step c) but after step b). In embodiments comprising three sub-groups of recesses and application of three materials, preferably the first material partially fills the plurality of recesses of the third sub-group in the first region, and the second material partially fills at least some of the plurality of recesses of the third subgroup in the first region, and the third material at least partially fills at least some of the plurality of recesses of the third sub-group in the first region partially filled by both the first and second materials, and substantially does not fill the plurality of recesses of the first sub-group in the first region, and substantially does not fill the plurality of recesses of the second sub-group in the first region filled by both the first and second materials. In these embodiments, again, the depth of the recesses determine the structure of the elements of the pattern. For example, the first sup-group may receive only the first material, the second subgroup may receive the first followed by the second material, and the third sub-group may receive the first material, followed by the second material, and followed by the third material.

Preferably, at least one of the plurality of recesses has a width of less than 50 μm, preferably less than 10 μm, more preferably less than 5 μm, and most preferably between about 1 to 3 μm. It will be understood that the width of recess is intended to mean the distance across the opening in the surface of the die form. For example, where the recess is a straight line trench, the width is the dimension of the opening in the surface of the die form in a direction perpendicular to its length, and where the recess is in the form of an alphanumeric character, the width is the line width of the typeface. Preferably the recesses have similar dimensions for depth.

Preferably, the plurality of recesses define an image element pattern or a microimage element pattern and in embodiments in which the plurality of recesses define the microimage element pattern, preferably each of the plurality of recesses or a group of the plurality of recesses corresponds to a microimage element of the microimage element pattern. Image element patterns and microimage element patterns are patterns particularly suited to generating optical effects such as lenticular effects, moiré magnification effects, and integral imaging effects. For example, an image element pattern may be an arrangement of substantially parallel, spaced apart, straight stripes intended to collectively form a first image in a lenticular device. Alternatively, for example, a microimage element pattern may be an arrangement of microimage elements in the form of identical icons that are intended to form a magnified version of the icon when moiré magnification is implemented.

As mentioned above, it is preferable that the first material has a first set of optical properties, and the second material has a second set of optical properties different from the first set of optical properties. In particular, it is preferable that the first material appears a first colour when viewed in reflected light and/or transmitted light, and wherein the second material appears a second colour when viewed in reflected light and/or transmitted light. It has been described above, that by providing materials of different colours, the pattern may be configured to have elements which appear different colours. If the first and second materials are substantially opaque, only the uppermost material will be visible when viewed from any one side. If the first and second materials are coloured, translucent materials, when viewed, for example in transmission, the colours of the materials may combine for the elements which comprise more than one material.

Preferably, the first material and/or the second material are resins and/or inks, and/or comprise luminescent, phosphorescent, fluorescent, magnetic, thermochromic, photochromic, iridescent, metallic, optically variable and/or pearlescent pigments.

Preferably the finished pattern is visible (optionally after magnification) to the human eye and so advantageously the material comprises at least one colourant which is visible under illumination within the visible spectrum. For instance, the material may carry a coloured tint or may be opaque. The colour will be provided by one or more pigments or dyes as is known in the art. Additionally or alternatively, the material may comprise at least one substance which is not visible under illumination within the visible spectrum and emits in the visible spectrum under non-visible illumination, preferably UV or IR.

In embodiments which involve curing the first and/or second material, preferably curing at least one of the first material and the second material comprises curing by exposure to radiation, and preferably by exposure to UV radiation.

Preferably, the substrate layer is a continuous web. Security documents, or security elements suitable for incorporation into security documents, are generally produced in the form of a continuous web for at least some portion of their manufacture. It is therefore preferable that the application of the pattern according to this method is also performed on a continuous web substrate layer. Further, it is preferable that the first material and/or the second material are substantially continuously applied to the surface of the substrate layer.

While the above method requires that a substrate be provided which has recesses in a surface, in some embodiments, step a) comprises: a) i) providing a substrate layer, the substrate layer having, on a first side of the substrate layer, a surface; and a) ii) forming in the surface a plurality of recesses defining the pattern. In other words, in some embodiments the substrate comprising recesses is provided by forming the recesses in a substrate layer. Many ways of forming recesses in a substrate layer, which would be suitable for forming the recesses according to the pattern, are known in the art. WO05052650 A2 and WO06125224 A2 disclose methods which would be suitable for forming in the surface a plurality of recesses defining the pattern.

The methods according to both the first and second aspect of the present invention are applicable to the production of documents of value, in particular banknotes, cheques, passports, identity cards, certificates of authenticity, fiscal stamps, and to the production of security elements.

In accordance with a third aspect of the present invention, there is provided a security element comprising: a pattern supporting layer having a first surface; a pattern comprising an array of laterally distributed pattern elements on the first surface of the pattern supporting layer or in a plurality of recesses in the first surface of the pattern supporting layer; and a first array of lenses over the array of laterally distributed pattern elements, wherein each pattern element of a first set of the pattern elements comprises a first layer of a first material on the first surface of the pattern supporting layer or in a plurality of recesses in the first surface of the pattern supporting layer; and a second layer of a second material over the first layer of the first material.

The security element of the third aspect of the present invention may be produced using the method according to either the first aspect or the second aspect. The security element may be integral to a security document, or may be produced for later application to or incorporation into a security document.

The security element comprises a pattern supporting layer. The term "pattern supporting layer" is intended to cover both the pattern support layer of the first aspect, and the substrate layer of the second aspect. More generally, the term pattern support layer is intended to cover any layer capable of supporting a pattern in or on its surface.

On or in the surface is a pattern comprised of a number of laterally distributed pattern elements. Here, laterally distributed is intended to mean distributed in the plane of the security element, which generally means in the plane of a security document to which it is applied.

At least a first set of pattern elements comprise a first layer of a first material and a second layer of a second material over the first layer of the first material. The first set may be substantially all of the pattern elements, or may be only a portion of the pattern elements.

In preferable embodiments, a first sub-group of the pattern elements have a first height, and a second sub-group of the pattern elements have a second height, greater than the first height. One way of forming these elements is using the different depth recesses described with respect to the first and second aspects of the present invention.

In some embodiments, each pattern element of a second set of the pattern elements comprises a layer of the first material and not a layer of the second material, or comprises a layer of the second material and not a layer of the first material. That is to say, a first set of elements are formed of layers of the first and second material, and the second set of elements have only one of the first and second material. In some embodiments, the first set of pattern elements comprises only pattern elements belonging to the second subgroup. That is to say that only the taller of the pattern elements are formed of layers of first and second material In some embodiments, it is further preferable that each pattern element of the second set of the pattern elements comprises a first layer of the first material and not a layer of the second material, and wherein the second set of the pattern elements comprises only pattern elements belonging to the first sub-group. That is to say that the elements formed of the first material are only the shorter pattern elements.

As mentioned above, in some embodiments, the first set of pattern elements is substantially all of the pattern elements.

Preferably, the pattern is an image element pattern or a microimage element pattern. This is intended to cover the patterns used in lenticular devices and moiré magnification and integral imaging devices. In embodiments in which the pattern is the microimage element pattern, preferably each of the pattern elements or a group of the pattern elements correspond to a microimage element of the microimage element pattern.

In some embodiments, the pattern supporting layer is substantially transparent or translucent. This may allow the pattern to be viewed from beneath the pattern supporting layer as well as or instead of above the pattern supporting layer. In particularly preferable embodiments, the first array of lenses are provided over a second surface of the pattern supporting layer opposite the first surface. This may allow lenticular, moiré magnification, and integral imaging effects to be observed through the pattern supporting layer.

Preferably, the security element further comprises a second array of lenses located over the array of laterally distributed pattern elements, and on an opposite side of the pattern supporting layer to the first array of lenses. Providing two sets of lenses may allow for lenticular, moiré magnification, and integral imaging effects to be observed from both sides of the pattern supporting layer.

So that the differences in the materials may be optically detectable, it is preferable that the first material has a first set of optical properties, and the second material has a second set of optical properties different from the first set of optical properties. In particular, it is preferable that the first material appears a first colour when viewed in reflected light and/or transmitted light, and the second material appears a second colour when viewed in reflected light and/or transmitted light. It will be understood that the first material may appear a first colour in reflected light, and appear the same colour in transmitted light, or may appear the first colour in reflected light and a different colour in transmitted light. Further the second colour may appear a second colour in reflected light, and appear the same colour in transmitted light, or may appear the second colour in reflected light and a different colour in transmitted light so long as some difference in colour of appearance exists between the first and second materials.

Preferably, the first materials and/or the second material are resins and/or inks, and/or comprise luminescent, phosphorescent, fluorescent, magnetic, thermochromic, photochromic, iridescent, metallic, optically variable and/or pearlescent pigments.

It is preferable that the first and/or second array of lenses are an array of cylindrical lenses, spherical lenses or aspherical lenses. However, any type of lens may be used.

In some embodiments, the first material and/or the second material are substantially opaque. This may allow one material to obscure the other when viewed in reflection, leading to some advantageous perceived differences between viewing from the first side and viewing from the second side.

In some embodiments, the first material and/or the second material are substantially transparent or translucent, and carry a coloured tint. In these embodiments, the colour of one material may affect what is perceived in transmission or reflection, even when it is behind the other material. It will be appreciated that one material could be transparent or translucent, and carry a coloured tint and the other be opaque.

The above security element may be applied to or incorporated into, or integrally formed with a documents of value, in particular banknotes, cheques, passports, identity cards, certificates of authenticity, fiscal stamps, and to the production of security elements.

BRIEF DESCRIPTION OF THE DRAWINGS

Examples of the invention will now be described with reference to the accompanying drawings, in which:

FIG. 9 is cross-sectional view of a fourth apparatus suitable for performing the method according to the first aspect of the present invention;

FIG. 14 is a flow diagram showing the method according to the second aspect of the present invention.

DETAILED DESCRIPTION

Figure 1:
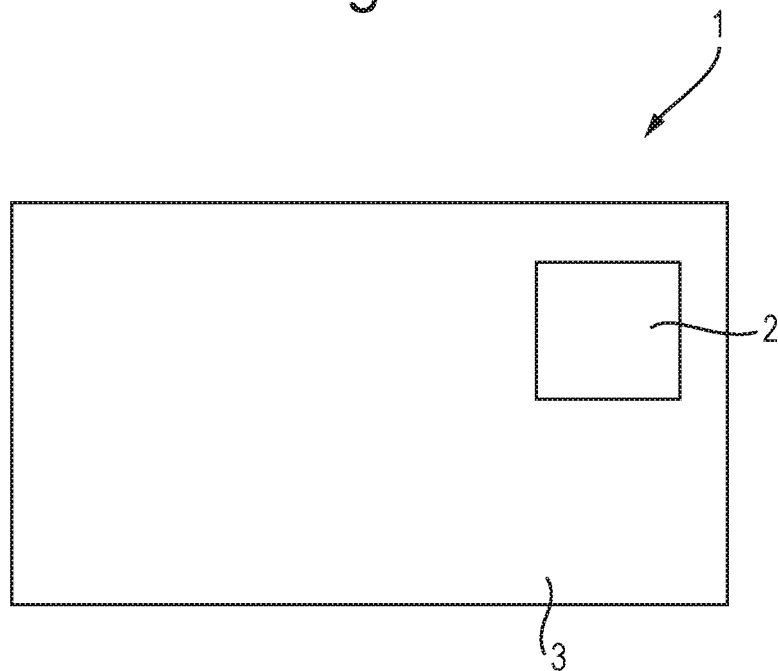
FIG. 1 is a plan view of a security document comprising a security element.

FIG. 1 shows a plan view of a security document 1 comprising a security element 2 manufactured in accordance with the method according to the present invention and located on a security document substrate 3. The security document in this example is a banknote, however security elements, such as security element 2, are suitable for use on many different security documents. The security element 2 in this example is an optical device integrally formed on a substrate layer of the banknote, however the method according to the present invention is also applicable to other security elements either integrally formed on a substrate layer of the banknote or separately formed for later application to the banknote or incorporation into the banknote substrate. Examples of suitable security elements include stripes, patches, threads, transfer foils, etc.

Figure 2A:
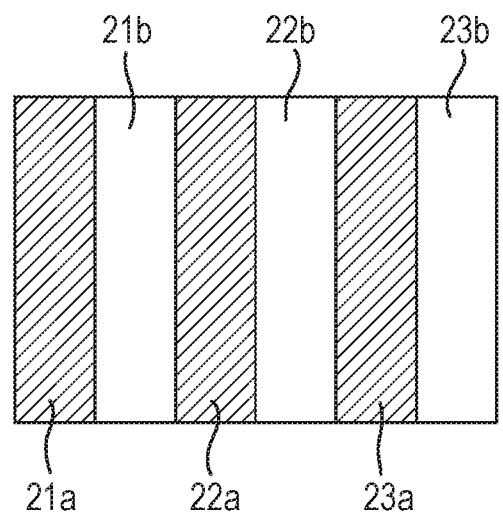
FIGS. 2A and 2B show a lenticular image element pattern and a cross-section of a lenticular security device having the lenticular image element pattern.
Figure 2B:
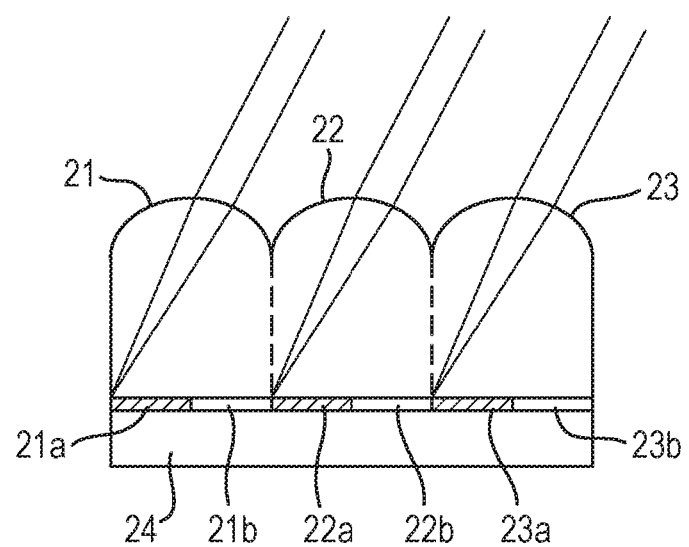

FIG. 2A shows an image element pattern suitable for use in the lenticular security device of 2B. The lenticular security device comprises a plurality of cylindrical lenses 21, 22, 23 over a series of image elements 21a, 21b, 22a, 22b, 23a, 23c located on a support layer 24. Each lens 21, 22, 23 has beneath it one of a first set of image elements 21a, 22a, 23a, the first set of image elements having corresponding slices of a first image, and one of a second set of image elements 21b, 22b, 23b, the second set of image elements having corresponding slices of a second image. When viewed from a first range of viewing angles, only the first set of image elements 21a, 22a, 23a are visible. When viewed from a second range of viewing angles, only the second set of image elements 21b, 22b, 23b are visible. The viewer therefore sees a first image corresponding to the first set of image elements 21a, 22a, 23a over the first range of viewing angles, and a second image corresponding to the second set of image elements 21b, 22b, 23b over the second range of viewing angles. The periodicity and therefore maximum base diameter for the cylindrical focussing elements is preferably in the range 5 to 200 µm, more preferably 10-100 µm and even more preferably 10 to 40 µm. The width of the image strip will be dependent on the type of optical effect required for example if the diameter of the focussing elements is 30 µm then a simple switch effect between two views A and B could be achieved using 15 µm wide image strips. Alternatively for a smooth animation effect it is preferable to have as many views as possible typically at least three but ideally as many as 30, in this case the width of the image strips could be in the range 0.5 to 6 µm.

Figure 3A:
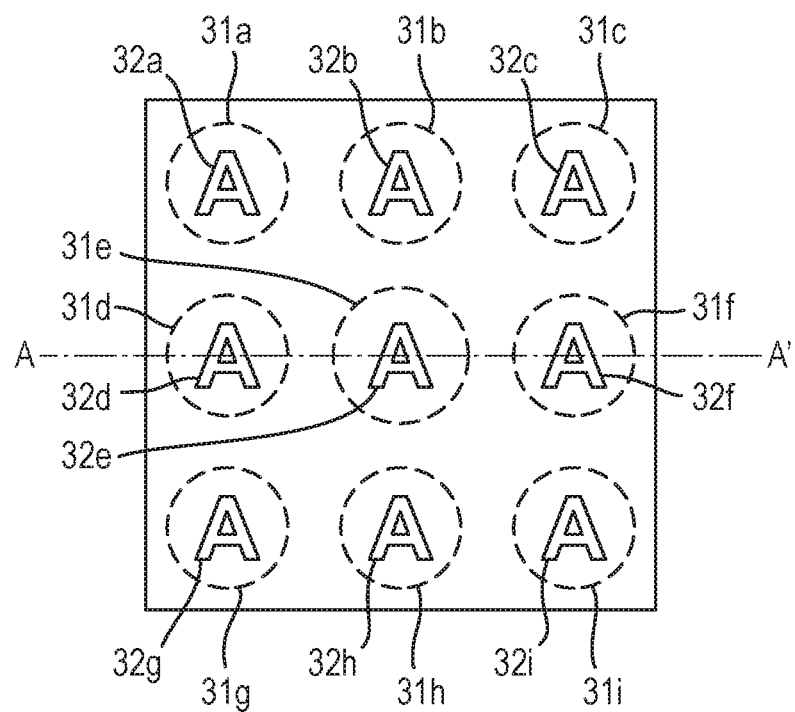
FIGS. 3A and 3B show a microimage element pattern and a cross-section of a moiré magnification device having the microimage element pattern.
Figure 3B:
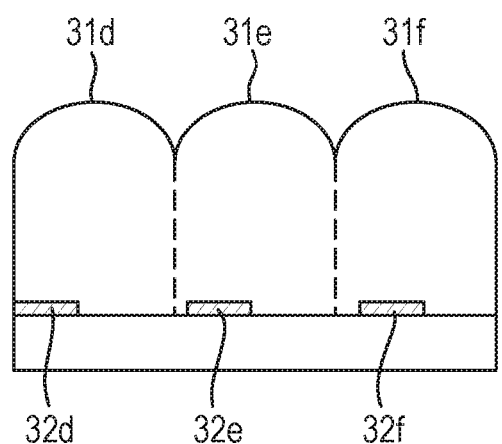

FIG. 3A shows a microimage pattern 32 suitable for use in the moiré magnification device 30 of FIG. 3B. The moiré magnification device comprises a two-dimensional array of spherical lenses 31a to 31i located above the microimage element pattern 32. The micro image pattern 32 comprises a two-dimensional array of microimage elements 32a to 32i each in the form of a letter 'A', the array of microimage elements 32a to 32i having a slightly different pitch than the above array of lenses 31a to 31i, as is well known in the art. The microimage elements 32a to 32i will typically have dimensions which are equal to or less than that of the lens diameter. The spherical lenses will typically have a diameter of less than 250 µm and more preferably less than 100 µm and even more preferably less than 50 µm and even more preferably less than 30 µm.

Figure 11:
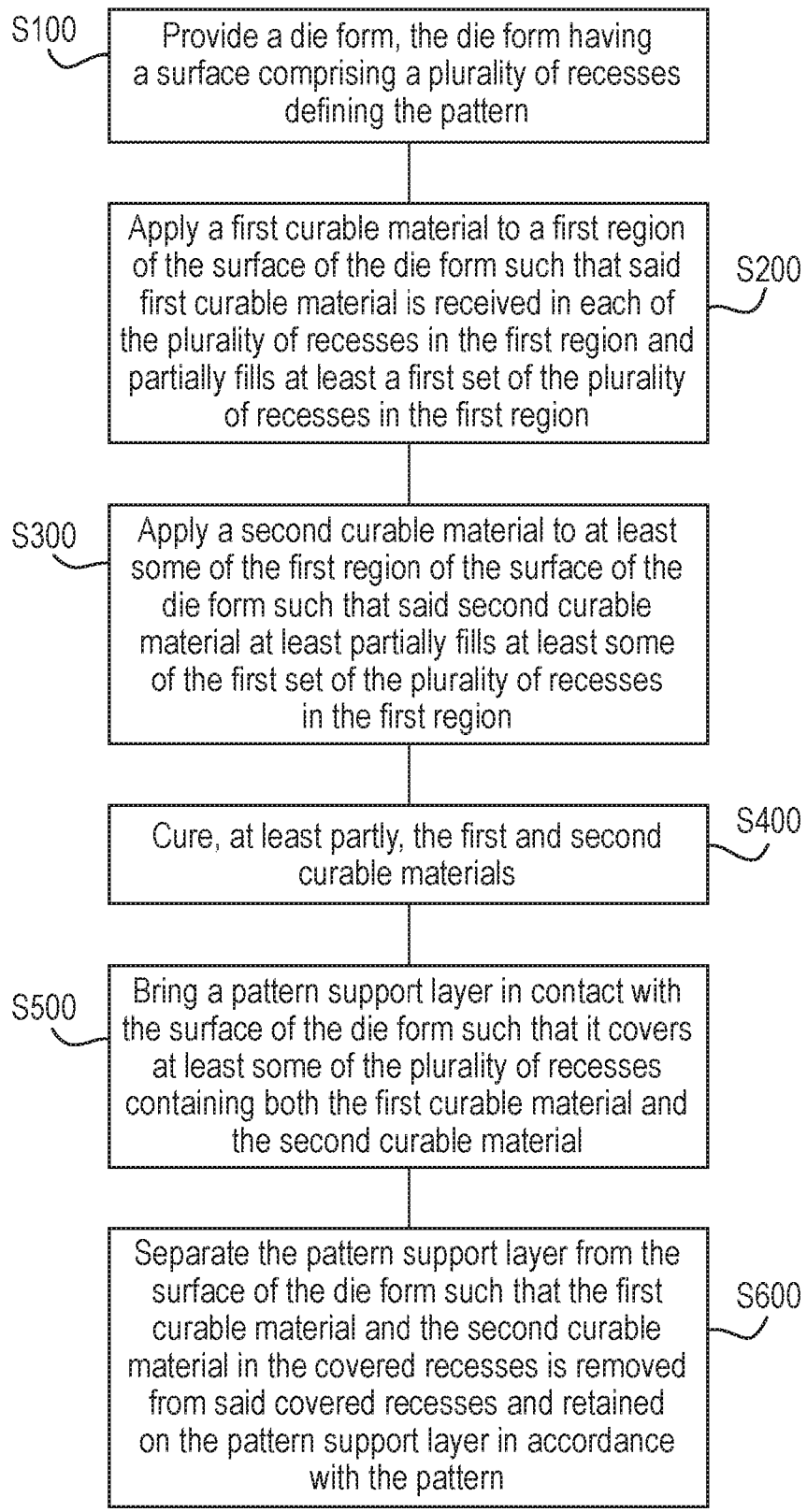
FIG. 11 is a flow diagram showing the method according to the first aspect of the present invention.

A method of forming a pattern, similar to those shown in FIGS. 2A and 3A, of at least two different materials will now be described with reference to the apparatus shown in FIG. 4 and the steps S100 to S600 of the flow diagram shown in FIG. 11.

Figure 4:
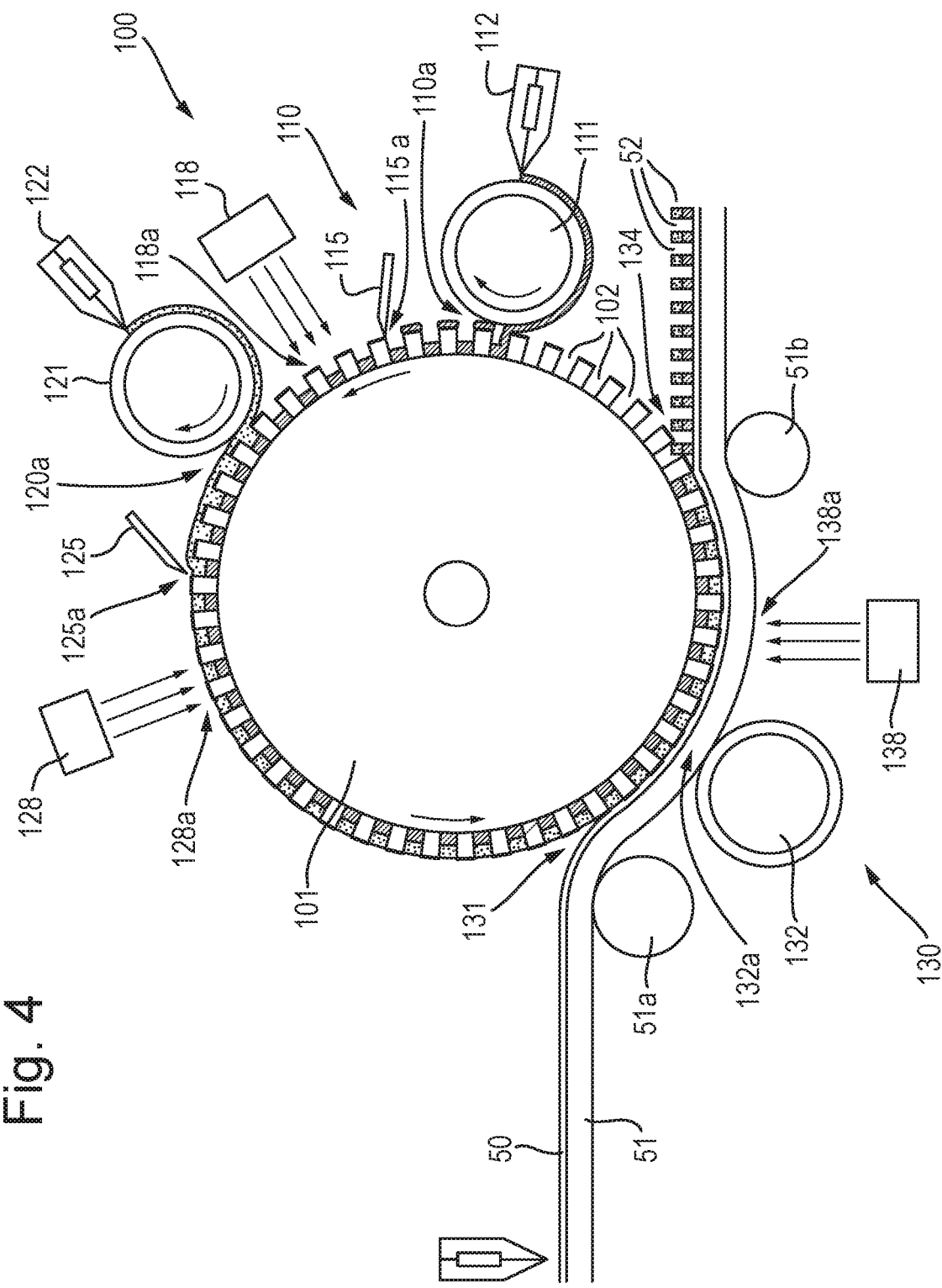
FIG. 4 is a cross-sectional view of an apparatus suitable for performing the method according to the first aspect of the present invention.

FIG. 4 shows a printing apparatus 100 suitable for executing the method according to the present invention. The printing apparatus 100 comprises a die form 101, which is provided in accordance with step S100. In this example, the die form 101 is a substantially cylindrical roller, which rotates about a fixed axis, the roller having a circumference of between 300 and 500 cm. The die form has in its surface a plurality of recesses 102. In this embodiment, the plurality of recesses 102 are a plurality of A-shaped recesses. Each recess has a line width of approximately 2 µm and a depth of approximately 3 µm. The recesses repeat over the surface of the die form in accordance with the desired layout of the micropattern to be applied.

The application of material in accordance with steps S200 and S300 and the processing of said material will now be described. It should be appreciated that the application, movement and processing of material will described with respect to some arbitrary portion of the material on the surface of the die form, and that while this portion of the material is described as being subjected to different processing steps sequentially, the described process involves continuous application, movement and processing of material.

The printing apparatus comprises a first material application system 110 for applying a first curable material of a first colour to the die form at a first application position 110a. The first material application system 110 comprises a first offset roller 111 located parallel to the substantially cylindrical die form roller 101 and rotatably mounted about fixed axis at a first position about the circumference of the die form roller 101, with their respective surfaces adjacent one another. The offset roller is coated with a UV-curable ink by an applicator 112. As the die form 101 rotates in an anti-clockwise direction, as viewed in FIG. 4, the offset roller 111 rotates clockwise such that the surface of the die form roller and the surface of the offset roller are traveling at approximately the same speed. Material applied to the surface of the offset roller 111 by the applicator 112 is transferred onto the surface of the die form at the application position 110a as the two rollers rotate, and is introduced into the recesses 102 in accordance with S200. The material is applied to the surface of the offset roller 111 of a thickness approximately equal to half the depth of the recesses 102 such that when the material is transferred onto the surface of the die form 101 it half fills the recesses into which it is received. While in this embodiment the material is applied of a thickness equal to half the depth of the recesses to substantially half fill the recesses, it will be appreciated that, depending on the dimensions of the recesses, a material thickness of more or less than half the depth of the recesses may be needed to half fill the recesses, and in these cases, the required thickness of material can be determined through trial and error. In this embodiment, the material is applied to the surface of the offset roller 111 such that, when transferred, it covers substantially the entire surface of the die form. While the material covers the entire surface of the die form in this embodiment, it will be appreciated that the region or regions to which it is applied may be only a portion of the total surface of the die form. For example, the material may be applied discontinuously in either or both the axial direction of the rollers and the circumferential direction of the rollers.

While, in the present embodiment, the first material application system 110 is described as comprising a first material applicator 112 which may entirely cover the surface of the roller 111, or only selectively apply material to the surface of the offset roller 111, other means of applying a first material over the entire or a partial region of the die form are foreseen. In an alternative construction (not shown) the first material application system 110 is replaced by a system comprising a first material applicator and a patterned roller, the patterned roller having a surface which is formed of an ink-receptive material, such as a rubber or plastic, in at least some areas, and a non-ink-receptive material, such as a smooth metal, in any other remaining areas. Here, the ink-receptive area may cover the entire surface of the patterned roller. Alternatively, the ink-receptive and non-ink-receptive areas may define the outline of the first region, i.e. the region of the die form that is to be coated in the first material so as to introduce first material into some of the recesses, and this first region may be in accordance with a pattern, for example defining one or more indicia. The first material applicator may coat the entire surface of the patterned roller with first material, in which case the inked patterned roller may be doctored to remove the first material from any non-ink-receptive areas, before it is brought into contact with the surface of the die form. Alternatively, the first material applicator may apply an all over coating to an intermediate roller, which then contacts the patterned roller. In such cases, the patterned roller will only pick up first material from the intermediate roller in those ink-receptive areas of the patterned roller. The above alternatives might involve the use of an excess of first material. Therefore, they may also require means for cleaning any excess first material. For example, in the former alternative, in which material is applied to a patterned roller and removed, the doctoring means, which may be a cleaning roller, may be cleaned by passing its surface through a vat of cleaning solution. In the latter alternative, in which the material is picked up by the patterned roller from an intermediate roller, the intermediate roller may be cleaned by passing its surface through a vat of cleaning solution after contact with the patterned roller. It will be appreciated that the above alternative construction of a material application system may be used in place of any of the below described material application systems in the ensuing embodiments.

Returning to the embodiment shown in FIG. 4, the die form 101 rotates further, moving the applied material away from the application position 110a to a doctoring blade 115 at doctoring position 115a. The doctoring blade 115 is a strip of material, typically steel or plastic, which contacts the surface of the die form 101 along its length. As the surface of the die form 101 moves past the doctoring blade 115, material not located in the recesses 102 of the die form is removed from the surface of the die form, leaving only the material that was received in the recesses to move past the doctoring position 115a. While the doctoring is shown and described as being performed by a doctoring blade, other doctoring means for use in place of, or in addition to, the doctoring blade are foreseen. In alternative embodiments, the material not located in the recesses may be removed by bringing the surface of the die form into contact with a doctoring surface, for example, the surface of a cleaning or wiping roller, or a sacrificial web, which picks up the material not located in the recesses. In such cases, the doctoring surface may need to be cleaned, for example, by providing for the doctoring surface to pass through a vat of cleaning solution to remove the first material. It will be appreciated that these alternative doctoring means may be used in place of, or in addition to, any of the below described doctoring blades in the ensuing embodiments.

The die form 101 continues to rotate, moving the material, now located exclusively in the recesses 102, to a curing position 118a. As the material passes through the curing position 118a the material in the recesses 102 is exposed to radiation from a UV light source 118 located above the surface of the die form 101. As the material passes beneath this UV light source it is partially cured and its viscosity increases.

The die form 101 rotates further, towards a second application position 120a. At the second application position 120a, a second curable material of a second colour is applied to the surface of the die form 101. This second curable material is applied by a second material application system 120. The second material application system is constructed similarly to the first, and comprises a second offset roller 121 located parallel to the substantially cylindrical die form roller 101 and rotatably mounted about a fixed axis at a second position about the circumference of the die form roller 101, with their respective surfaces adjacent one another. The offset roller is coated with a UV-curable ink by a second applicator 122. As the die form 101 and the second offset roller 121 rotate, the material on the offset roller is transferred onto the surface of the die form at the application position 120a, and is introduced into the recesses 102 in accordance with step S300. The second material is applied to the surface of the offset roller 121 of a thickness approximately equal to half the depth of the recesses 102 such that when the material is transferred onto the surface of the die form 101 and is received in the recesses already half filled with the first curable material, it substantially completes the filling of the recesses. In this embodiment, the second material is applied to the roller 121 such that, when transferred, it covers substantially the entire surface of the die form 101, and hence completes the filling of all of the recesses 102 which were half filled by the first curable material. It will be appreciated however, that the second material need only be applied such that it completes the filling of some of the recesses partially filled by the first material. This may or may not include the second material being received in recesses 102 which did not receive the first material. As for the first material, the second material may be applied discontinuously in either or both the axial direction of the rollers and the circumferential direction of the rollers.

Once the second material has been applied to the die form 101, in a similar way to the first material, and received in the recesses 102, as the die form continues to rotate, the second material is moved towards a second doctoring blade 125 at second doctoring position 125a. As with the first doctoring blade 115, the second doctoring blade 125 is a strip of material, typically steel or plastic, which contacts the surface of the die form 101 along its length. As the surface of the die form 101 moves past the second doctoring blade 125, material not located in the recesses 102 of the die form is removed from the surface of the die form, leaving only the material that was received in the recesses to move past the doctoring position 125a.

The die form 101 continues to rotate, moving the recesses containing cured or partially cured first material and uncured second material to a second curing position 128a. As the second material passes through the curing position 128a the material is exposed to radiation from a second UV light source 128 located above the surface of the die form 101. As the material passes beneath this UV light source it is at least partially cured and its viscosity increases in accordance with step S400. If the first material was fully cured at the first curing position 118a, the second UV light source may only cure the second curable material in the recesses 102. Alternatively, if the first material was only partially cured at the first curing position 118a, the second UV light source may cure the second curable material while further curing the first curable material. In this embodiment, both the first and second material are left partially cured after both curing steps.

With the die form now having a plurality of recesses containing multiple layers of cured material, the die form continues to rotate, bringing the first and second materials to a pattern removal system 130. The material in the die form 101 first arrives at a pattern support layer application position 131. In this embodiment, the pattern support layer 50 is an optically clear tie coat provided continuously over an upper surface of a continuous substrate web 51, the substrate of the substrate web being one suitable for use as a security document. The web of substrate 51 moves along a web path, and is supported along its path by rollers 51*a*, 51*b*. At the pattern support layer application position 131 the pattern support layer 50 on the web of plastic substrate is brought into contact with the surface of the die form 101 such that the pattern support layer covers at least the recesses containing multiple layers of cured material, which in this embodiment is all of the recesses, in accordance with step S500. The substrate web is partially wrapped around the surface of the die form, which is to say that the substrate web follows the circumference of the die form 101 for approximately a quarter of the circumference of the die form. The movement speed of the web of substrate 51 is configured such that for the duration of the partial wrap, the pattern support layer 50 does not move with respect to the surface of the die form 101 as the die form rotates.

The surface of the die form and the substrate web 51 move away from the pattern support layer application position 131 through further rotation of the die form 101, and towards an impression position 132*a*. At the impression position, the substrate web 51 passes over an impression roller 132 which is positioned to press the substrate web 51, and hence the pattern support layer against the surface of the die form 101. This pressing of the pattern support layer 50 against the surface of the die form also presses the pattern support layer against the material in the recesses 102, allowing the pattern support layer to get a good anchoring to the first and second materials.

The surface of the die form 101 and the substrate web 51 continue to move to a pattern support layer curing position 138*a*. At the pattern support layer curing position, UV radiation from a third UV light source 138 impinges on the pattern support layer 50 and the first and second materials in the first and second sets of recesses 102*a*, 102*b*. Impingement of the UV radiation on the pattern support layer is permitted through the web substrate 51 as, in this embodiment, the web substrate is an optically clear substrate, and impingement of the UV radiation on the material in the recesses is permitted through the substrate web 51 and the pattern support layer 50 because the pattern support layer is the optically clear tie coat. Curing of the pattern support layer 50 and further curing of the material in the recesses 102 while the two are in contact results in a firm bond forming between the two materials.

After the pattern support layer 50 has been cured, the surface of the die form 101 and the substrate web 51 continue to a pattern removal location 134, at which the materials in the recesses 102 are removed from said recesses. The removal of the materials occurs as the direction of travel of the substrate web 51 becomes different than direction of travel of the surface of the die form 101, and the pattern support layer 50, which is secured to the substrate web 51, is pulled away from the surface of the die form. This pulling of the pattern support layer 50 from the surface of the die form in a peeling-type motion causes the materials in the recesses 102 to be pulled from the recesses 102 and retained on the pattern support layer in accordance with the pattern in step S600. In this embodiment, the resulting pattern on the pattern support layer reflects the arrangement of recesses, and each element 52 of the pattern is formed of two layers of different curable materials.

The substrate web 51 with pattern support layer 50 having a pattern formed of first and second materials on its upper surface is then conveyed away from the die form by movement of the substrate web, and used in forming security documents and/or security elements. Meanwhile, the surface of the die form, now featuring once again empty recesses 102 continues round and arrives back at the first material application system 110 where material can be reapplied.

Figure 5A:
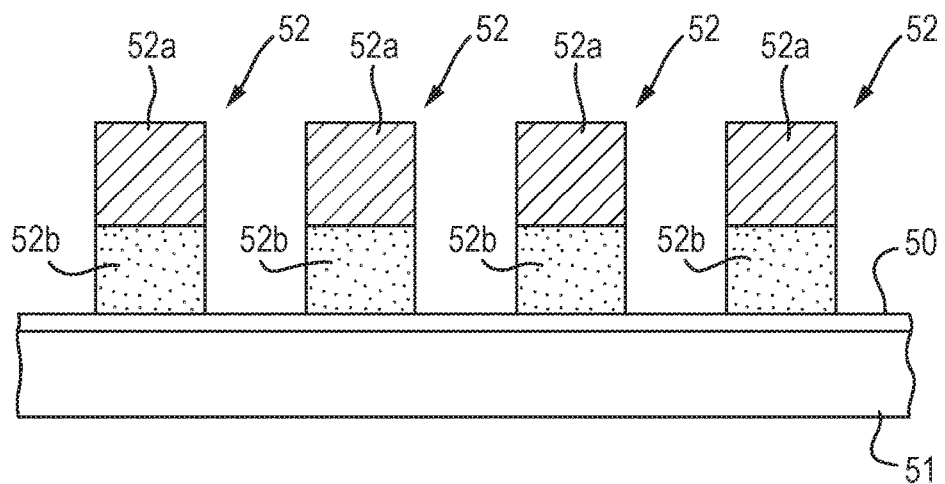
FIGS. 5A to 5C are schematic representations of the pattern elements formed using the apparatus of FIG. 4 in cross-sectional, top and bottom views respectively.
Figure 5B:
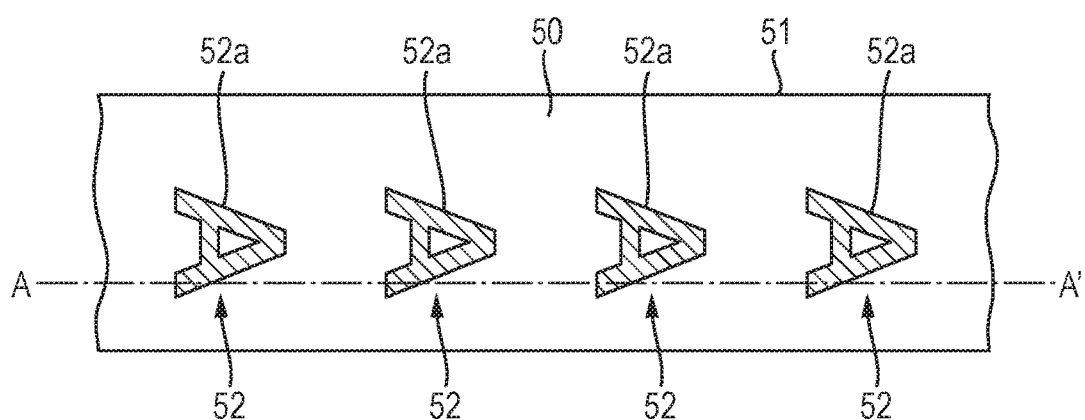
Figure 5C:
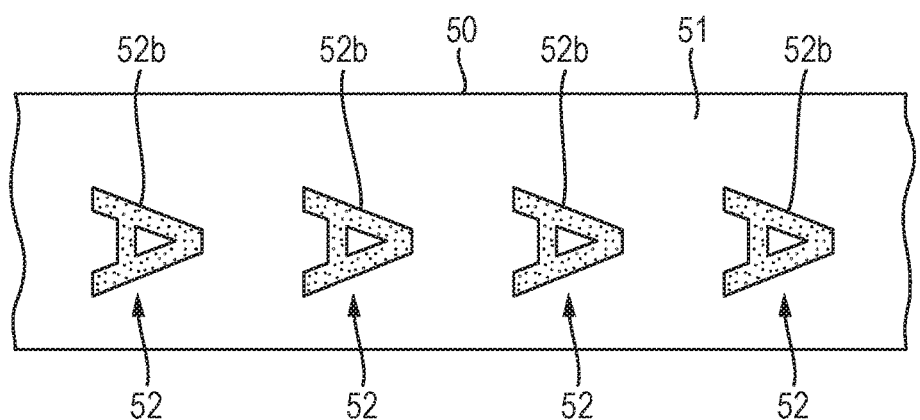

A highly schematic example of the pattern produced using the above method is shown in FIGS. 5A to 5C. FIG. 5A shows a cross-section through the pattern elements 52, and through the pattern support layer 50 and the substrate layer 51. Each pattern element 52 comprises an upper layer 52*a* of coloured opaque material, which corresponds to the first material applied to the die form 101 in the above method, and a lower layer 52*b* of differently coloured opaque material, which corresponds to the second material applied to the surface of the die form in the above method. The upper layer 52*a* sits on the lower layer 52*b*, which sits on the pattern support layer 50. FIG. 5B shows the pattern as it appears from an upper side of the pattern support layer. In this view, only the upper layer 52*a* is visible, with the lower layer 52*b* obscured by the upper layer. The elements 52 of the pattern therefore appear the colour of the upper layer material. FIG. 5C shows the pattern as it appears from a lower side of the pattern support layer, i.e. through a transparent substrate layer 51 and pattern support layer 50. In this view, only the lower layer 52*b* is visible, with the upper layer 52*a* obscured by the lower layer. The elements 52 of the pattern therefore appear the colour of the lower layer material.

Figure 6:
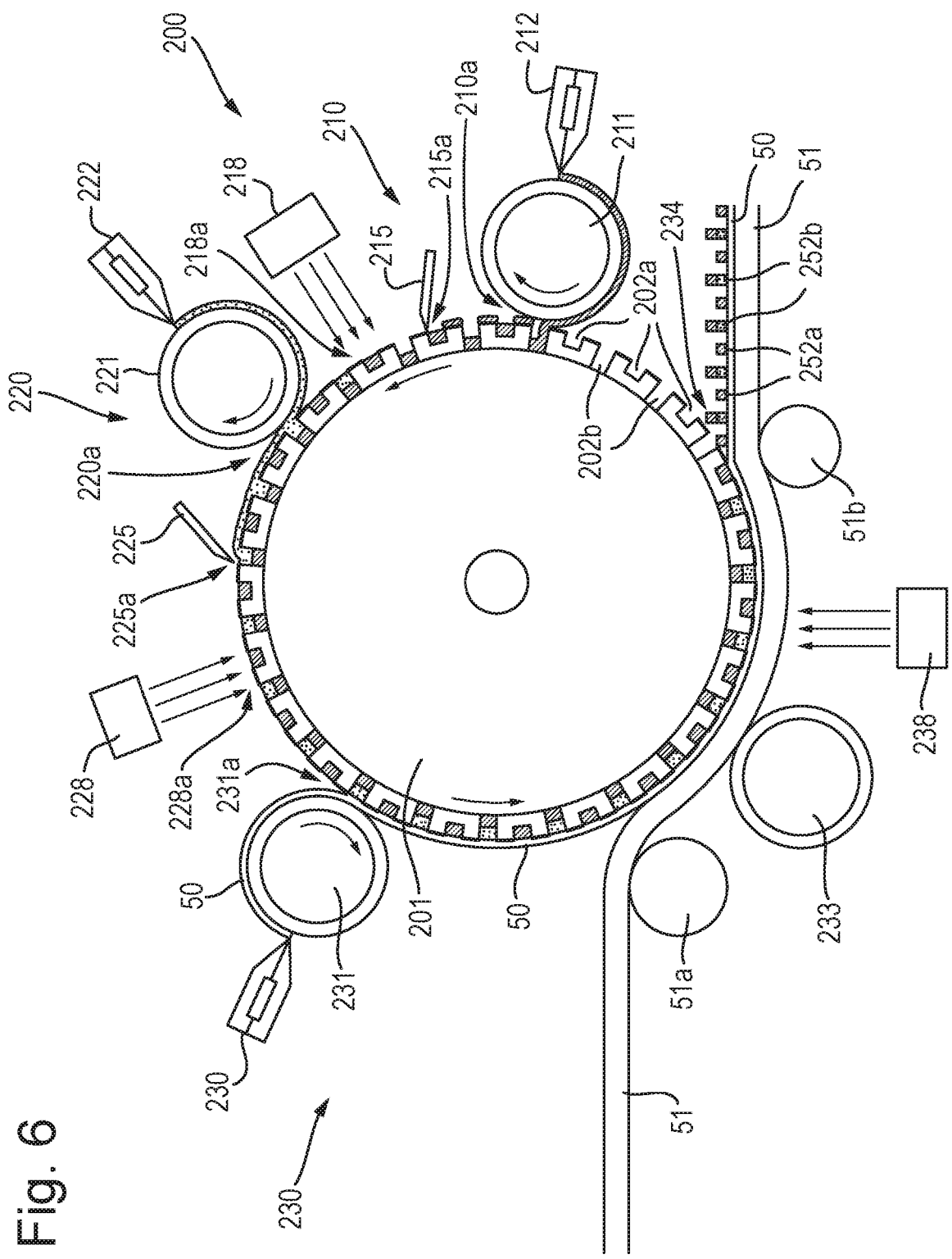
FIG. 6 is a cross-sectional view of a second apparatus suitable for performing the method according to the first aspect of the present invention.

FIG. 6 shows a second apparatus 200 suitable for performing the method of the first aspect of the claimed invention. The printing apparatus 200 comprises a die form 201, which is provided in accordance with step S100. The die for 201 is similar to the die form 101 discussed above in relation to FIG. 4; the die form 201 is a substantially cylindrical roller, which rotates about a fixed axis. The die form 201 differs from the previously discussed die form in that it has in its surface a plurality of recesses, with a first sub-group of these recesses 202*a* being of a first depth of approximately 2 µm, and second sub-group of these recesses 202*b* being of a second depth, twice that of the first depth. In this embodiment, the plurality of recesses are, again, a plurality of A-shaped recesses. The recesses repeat over the surface of the die form in accordance with the desired layout of the micropattern to be applied.

The application of material in accordance with steps S200 and S300 and the processing of said material will now be described.

The printing apparatus comprises a first material application system 210 for applying a first curable material of a first colour to the die form at a first application position 210*a*. The first material application system is identical to that of the embodiment discussed in relation to FIG. 4. The roller 211 of the first material application system is supplied with material by the first applicator 212. The first applicator provides material of thickness substantially equal to the depth of the recesses of the first subgroup. When the roller 211 and the die form 201 rotate, material applied to the surface of the offset roller 211 by the applicator 212 is transferred onto the surface of the die form at the application position 210*a*, and is introduced into both the first sub-group of recesses 202*a* and the second sub-group of recesses 202*b* in accordance with step S200. The first material substantially fills the first sub-group of recesses 202a and approximately half-fills the second sub-group of recesses 202b. In this embodiment, the material is applied to the surface of the offset roller 211 such that, when transferred, it covers substantially the entire surface of the die form. While the material covers the entire surface of the die form in this embodiment, it will be appreciated that the region or regions to which it is applied may be only a portion of the total surface of the die form. For example, the material may be applied discontinuously in either or both the axial direction of the rollers and the circumferential direction of the rollers.

The die form 201 rotates further, moving the applied material away from the application position 210a to a doctoring blade 215 at doctoring position 215a. The doctoring blade 215 is similar to the doctoring blade of the embodiment of FIG. 4. As the surface of the die form 201 moves past the doctoring blade 215, material not located in the recesses of the die form is removed from the surface of the die form, leaving only the material that was received in the recesses to move past the doctoring position 215a.

The die form 201 continues to rotate, moving the material, now located exclusively in the recesses, to a curing position 218a. As the material passes through the curing position 218a the material in the recesses is exposed to radiation from a UV light source 218 located above the surface of the die form 201. As the material passes beneath this UV light source it is partially cured and its viscosity increases.

The die form 201 rotates further, towards a second application position 220a. At the second application position 220a, a second curable material of a second colour is applied to the surface of the die form 201. This second curable material is applied by a second material application system 220. The second material application system is constructed similarly to the first, and comprises a second offset roller 221 located parallel to the substantially cylindrical die form roller 201 and rotatably mounted about a fixed axis at a second position about the circumference of the die form roller 201, with their respective surfaces adjacent one another. The offset roller is coated with a UV-curable ink by a second applicator 222. As the die form 201 and the second offset roller 221 rotate, the material on the offset roller is transferred onto the surface of the die form at the application position 220a, and is introduced into only the second sub-group recesses 202b in accordance with step S300. The material is only received in the second sub-group of recesses because the first sub-group of recesses have been substantially filled with the first material. The second material is applied to the surface of the offset roller 221 of a thickness approximately equal to half the depth of the second sub-group of recesses 202b such that when the material is transferred onto the surface of the die form 201 and is received in the already half-filled second subs-group of recesses, it substantially completes the filling of the recesses. In this embodiment, the second material is applied to the roller 221 such that, when transferred, it covers substantially the entire surface of the die form 201, and hence completes the filling of all of the second sub-group of recesses 202b. It will be appreciated however, that the second material need only be applied such that it completes the filling of some of the recesses partially filled by the first material. This may or may not include the second material being received in recesses which did not receive the first material (e.g. if the first material was not applied to the entire surface of the die form). As for the first material, the second material may be applied discontinuously in either or both the axial direction of the rollers and the circumferential direction of the rollers.

Once the second material has been applied to the die form 201, in a similar way to the first material, and received in the second sub-group of recesses 202b, as the die form continues to rotate, the second material is moved towards a second doctoring blade 225 at second doctoring position 225a. As with the first doctoring blade 215, the second doctoring blade 225 is a strip of material, typically steel or plastic, which contacts the surface of the die form 201 along its length. As the surface of the die form 201 moves past the second doctoring blade 225, material not located in the recesses of the die form is removed from the surface of the die form 201, leaving only the material that was received in the recesses to move past the doctoring position 225a.

The die form 201 continues to rotate, moving the recesses containing cured or partially cured first material and uncured second material to a second curing position 228a. As the second material passes through the curing position 228a the material is exposed to radiation from a second UV light source 228 located above the surface of the die form 201. As the material passes beneath this UV light source it is at least partially cured and its viscosity increases in accordance with step S400. If the first material was fully cured at the first curing position 218a, the second UV light source may only cure the second curable material in the second sub0-group of recesses 202b. Alternatively, if the first material was only partially cured at the first curing position 218a, the second UV light source may cure the second curable material while further curing the first curable material. In this embodiment, both the first and second material are left partially cured after both curing steps.

With the die form now having filled first and second sub-groups of recesses 202a, 202b, the die form continues to rotate, bringing the first and second materials to a pattern removal system 230. In this embodiment, the pattern support layer 50 is not provided on a substrate web 51, but rather is applied to surface of the die form as layer of curable material. An offset roller 231 is coated in an optically clear curable material from an applicator 232 and, as it rotates, transfers the curable material to the surface of the die form 201 at a coating position 231a such that it covers all of the recesses of the die form 201.

The surface of the die form continues to rotate, bringing the curable pattern support layer 50, which now covers the material in the recesses 202, in contact with a substrate web 51 which wraps around a part of the circumference of the die form 201. The substrate web is pre-primed, which means that the surface has been treated to promote bonding of the substrate layer with the pattern support layer such that the pattern support layer is firmly retained on the substrate layer. The substrate web urges the pattern support layer 50 against the material in the recesses 202 as they pass through a second curing position 238a. At this curing position, UV radiation from a UV light source cures the pattern support layer, and optionally cures the material in the plurality of recesses, thereby forming a strong bond between the patent support layer and the material in the recesses, and the patent support layer and the pre-primed substrate web 51.

After the curing, the surface of the die form 201, the cured pattern support layer, and the substrate web 51 continue to a pattern removal location 234, at which the materials in the recesses 102 are removed from said recesses. The removal of the materials occurs as the direction of travel of the substrate web 51 becomes different than direction of travel of the surface of the die form 101, and the pattern support layer 50, which is now secured to the pre-primed substrate web 51, is pulled away from the surface of the die form. This pulling of the pattern support layer 50 from the surface of the die form in a peeling-type motion causes the materials in the recesses 202 to be pulled from their recesses and retained on the pattern support layer in accordance with the pattern in step S600. In this embodiment, the resulting pattern on the pattern support layer reflects the arrangement of recesses. A first set of elements of the pattern 252a are formed of a single layer of the first material. A second set of elements of the pattern 252b are formed of two layers comprising a layer of first material on top of a layer of the second material.

The substrate web 51 with pattern support layer 50 having a pattern formed of first and second materials on its upper surface is then conveyed away from the die form by movement of the substrate web, and used in forming security documents and/or security elements. Meanwhile, the surface of the die form, now featuring once again empty recesses continues round and arrives back at the first material application system 210 where material can be reapplied.

Figure 7A:
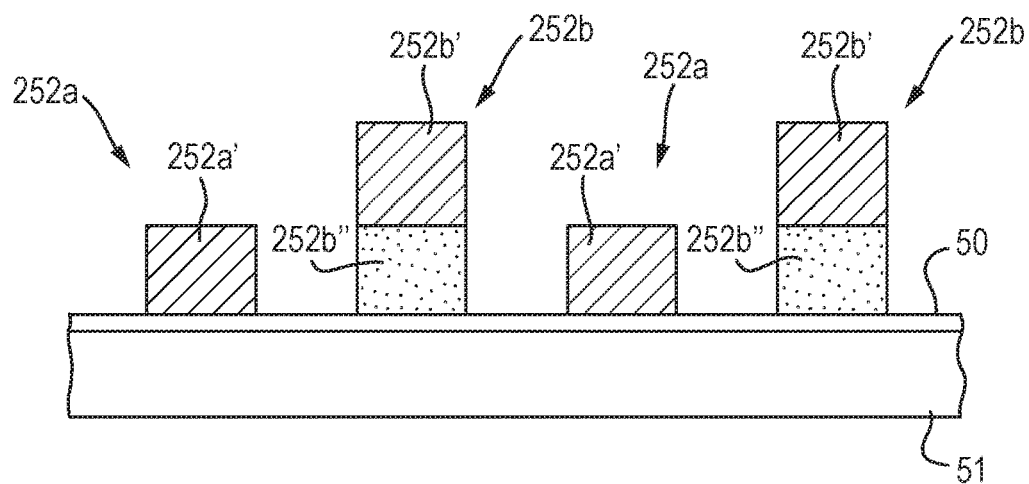
FIGS. 7A to 7C are schematic representations of the pattern elements formed using the apparatus of FIG. 6 in cross-sectional, top and bottom views respectively.
Figure 7B:
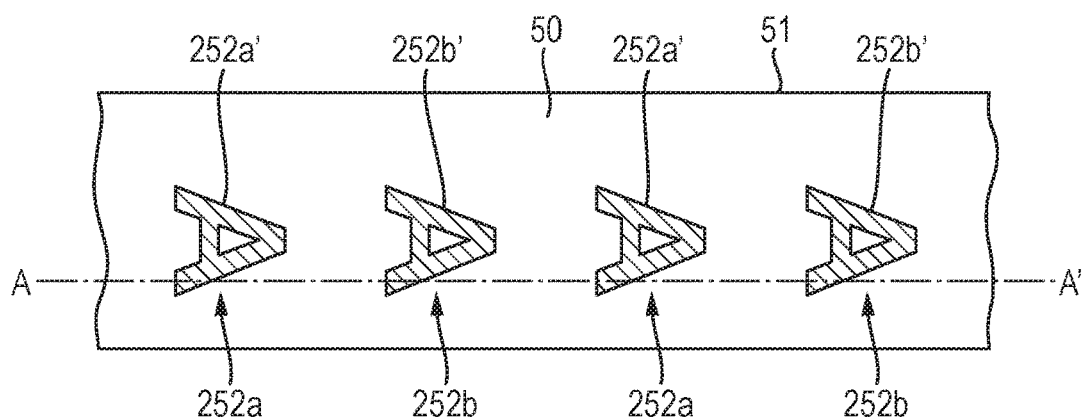
Figure 7C:
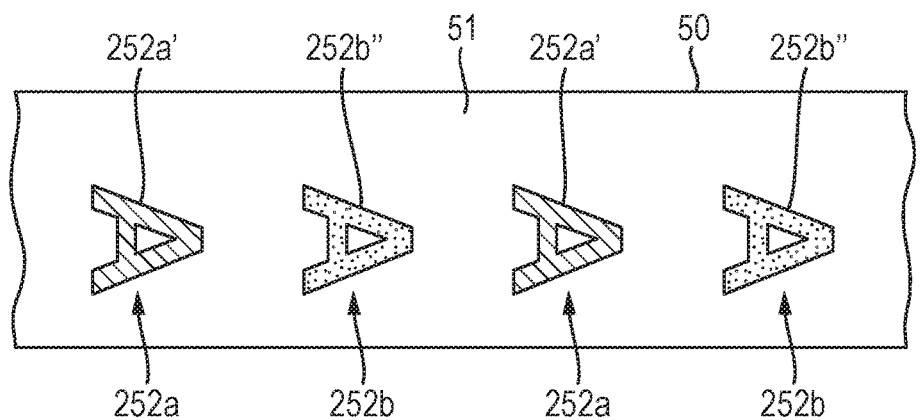

FIG. 7 shows a highly schematic example of the pattern produced using the method described with respect to FIG. 6. FIG. 7A shows a cross-section through the pattern elements 252a, 252b, and through the pattern support layer 50 and the substrate layer 51. Each of the first set of pattern elements 252a corresponds to the first sub-group of recesses 202a, are formed of a single layer of the first material 252a' on the pattern support layer 50. Each of the second set of pattern elements 252b corresponds to the second sub-group of recesses 202b, and are formed of an upper layer of first material 252b' on top of a lower layer of the second material 252b'' on the pattern support layer 50. FIG. 7B shows the pattern as it appears from an upper side of the pattern support layer. In this view, only the first material of the single layer 252a' of first set of elements 252a and the first material of the upper layer 252b' of the second set of elements 252b is visible. The elements 252a, 252b of the pattern therefore appear the colour of the first material. FIG. 7C shows the pattern as it appears from a lower side of the pattern support layer, i.e. through a transparent substrate layer 51 and pattern support layer 50. In this view, the first material of the single layer 252a' of first set of elements 252a and the second material of the lower layer 252b'' of the second set of elements 252b are visible. The elements 252a of the pattern therefore appear the colour of the first material and the elements 252b of the pattern appear the colour of the second material.

The views shown in 7A to 7C assume use of an opaque ink. However, it is possible that a coloured, transparent or translucent ink could be used instead. The result of this alternative is that, when viewed especially in transmission, the colours of the different layers 252b', 252b'' of the second set of elements 252b may appear a combination of the colours of the respective materials. In these embodiments, the elements 252a of the pattern would appear the colour of the first material, regardless of which side they were viewed from, and the elements 252b of the pattern appear a combination of the colours of the first and second materials, regardless of which side they are viewed from.

Other interesting optical effects can be achieved by using different combinations of materials as the different layers, including for example, the combination of coloured inks and clear fluorescent inks.

Figure 8:
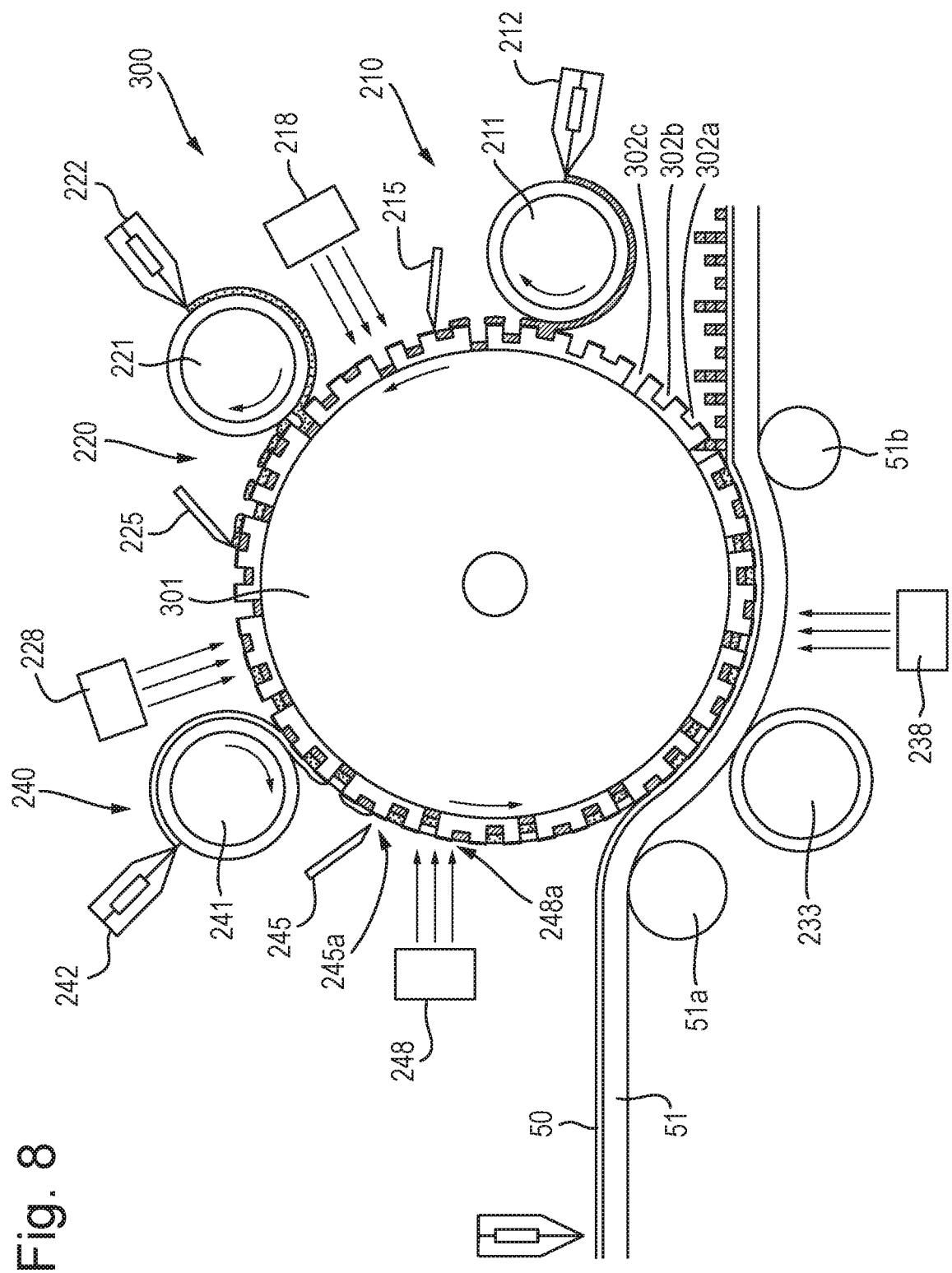
FIG. 8 is a cross-sectional view of a third apparatus suitable for performing the method according to the first aspect of the present invention.

FIG. 8 shows a third apparatus 300 suitable for performing the method of the first aspect of the claimed invention. The apparatus is very similar to the second apparatus 200, but uses a die form 301 which has a first sub-group of recesses 302a of a first depth, a second sub-group 302b of a second depth approximately twice that of the first depth, and a third sub-group 302c of a third depth approximately three times that of the first depth. The first material application system 210 applies a first material of a thickness which completely fills the first sub-group of recesses 302a, half fills the second sub-group of recesses 302b, and a third fills the third sub-group of recesses 302c. The second material application system 220 applies a second material of a thickness which completes the filling of the second sub-group of recesses 302b, and fills the third sub-group of recesses 302c to approximately two thirds full. The third apparatus then comprises a third material application system 240, structured similarly to the first and second material application systems, and comprising an offset roller 241, an applicator 242, a doctoring blade 245, and a UV light source 248. The third material application system 240 applies a third material, in a similar way to the first and second material application systems, such that the third sub-group of recesses become completely filled.

When the materials are removed from the die form 301 using the same technique described above, the result is a pattern having elements formed only of the first material, elements formed of the first and second material, and elements formed of the first, second and third material.

FIG. 9 shows a fourth apparatus. The fourth apparatus is identical to the apparatus of FIG. 8, but instead uses a die form with recesses of constant depth. FIG. 9 shows the apparatus applying a first material, using the first material application system, all over the surface of the die form 101 such that it half fills all of the recesses 102. The second material application system 220 selectively applies the second material to the surface of the die form such that the second material completes the filling of only some of the recesses 102. The third material application system 240 then applies a third material all over the surface of the die form, the third material completing the filling of all of the recesses 102 not filled by the second material.

When the material is removed from the recesses 102 using the techniques described above, the result is a multi-layered pattern where all of the elements have a layer of the first material, a first half have an additional layer of a second material, and the remaining half have an additional layer of a third material.

Figure 10A:
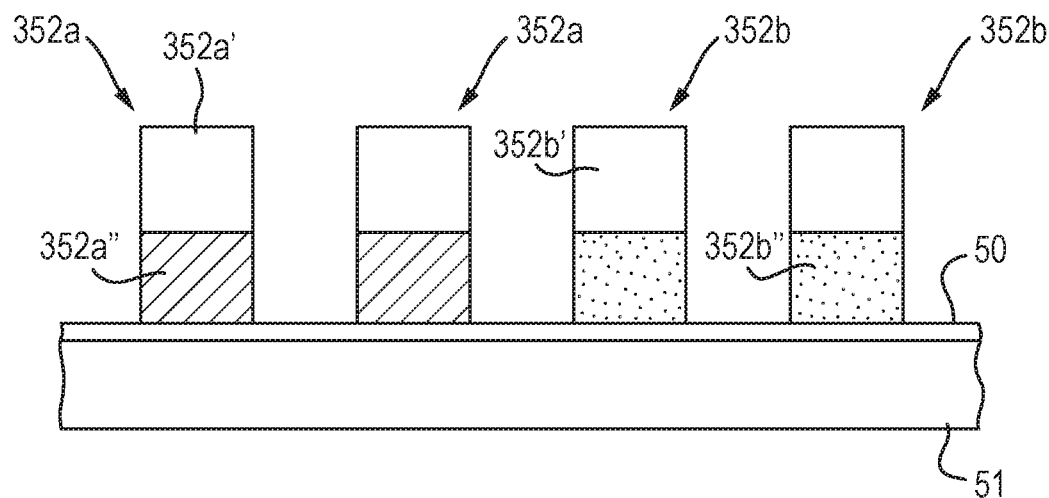
FIGS. 10A to 10C are schematic representations of the pattern elements formed using the apparatus of FIG. 9 in cross-sectional, top and bottom views respectively.
Figure 10B:
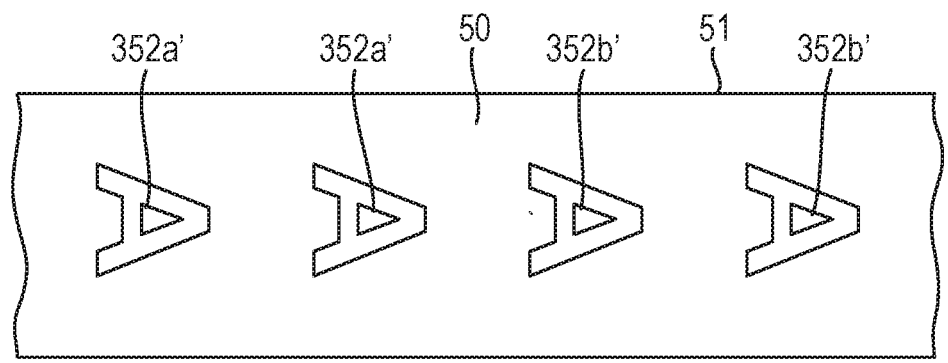
Figure 10C:
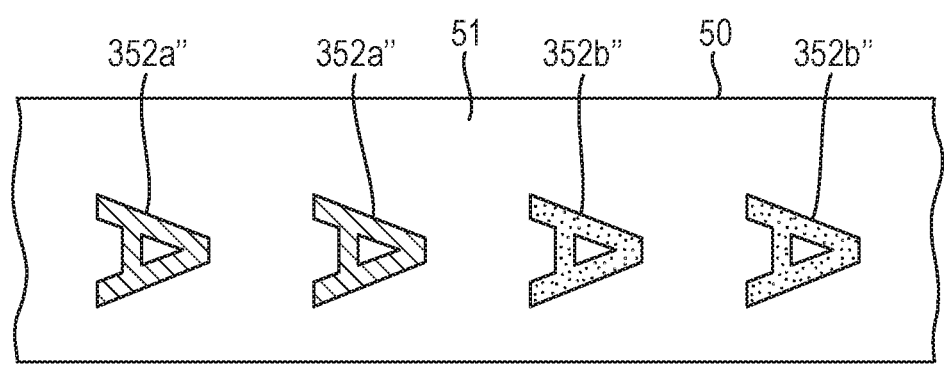

An exemplary pattern formed as described with respect to FIG. 9 is shown in FIGS. 10A to 10C. A first set of elements 352a comprise an upper layer of the first material 352a' and a lower layer of the second material 352a''. A second set of elements 352b comprise an upper layer of the first material 352b' and a lower layer of the third material 352b''. When viewed from above, if opaque materials are used, only the first material is visible. When viewed from below, the first set 352a appear the colour of the second material and the second set 352b appear the colour of the third material. Instead of opaque materials, transparent, translucent, fluorescent etc. materials may be used as the first, second or third materials to produce optically striking patterns.

Figure 12:
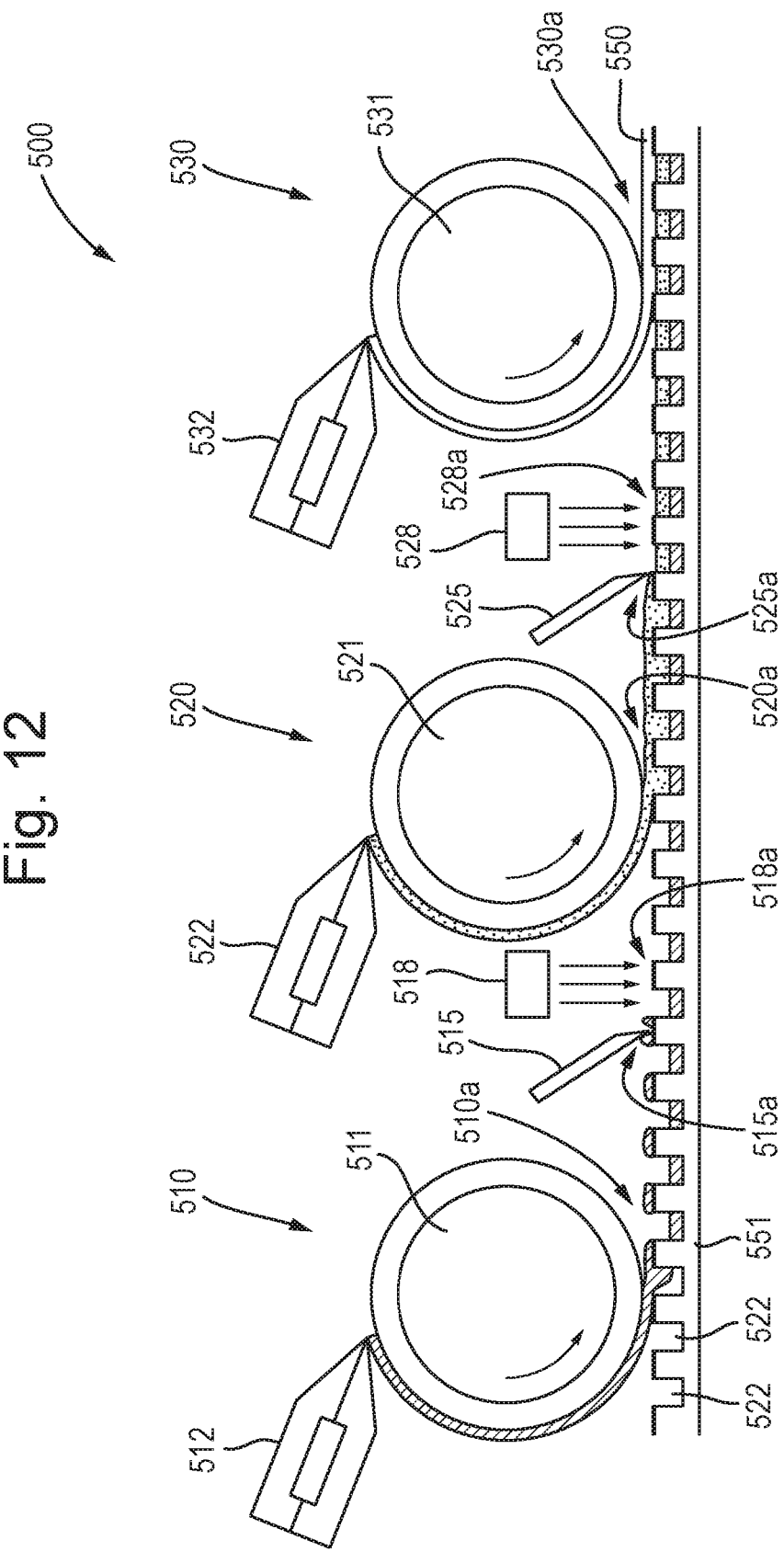
FIG. 12 is a cross-sectional view of an apparatus suitable for performing the method according to the second aspect of the present invention.

The method of forming a pattern of at least two different materials in a substrate layer according to the second aspect of the present invention will now be described with reference to FIGS. 12 to 14.

In this embodiment of the invention, two different materials are applied by a printing apparatus 500 to the surface of a substrate 551, the substrate having a plurality of recesses 552 which define the desired pattern, and which receive the two materials. The substrate 551 is provided, in accordance with step S1100, in the form of a continuous web which travels in a direction along the web path and is supported along its path by rollers (not shown).

The printing apparatus comprises a first material application system 510, a second material application system 520, and a sealing layer application system 530 each located successively along the length of the path of the web substrate 551.

The first material application system 510 comprises a first offset roller 511 rotatably mounted about a fixed axis above the substrate web, orientated across the direction of travel of the substrate web. The offset roller is coated with a UV-curable ink by an applicator 512. The continuous web of substrate 551 follows a path which brings it adjacent the offset roller 511. As the continuous web travels along its path, the offset roller rotates, coating the surface of the substrate web 551 with a first material at the first material application position 510*a*. The first material is thereby introduced into the plurality of recesses 552 according to step S1200. The material is applied to the surface of the offset roller 511 of a thickness approximately equal to half the depth of the recesses 552 such that when the material is transferred onto the surface of the substrate web 551 it half fills the recesses into which it is received. In this embodiment, the material is applied to the surface of the offset roller 511 such that, when transferred, it covers substantially the entire surface of the substrate layer. However, the various possibilities for applying the first material to the surface of the die form described above in the discussion of the first aspect of the present invention apply equally to the application of the first material to the surface of the substrate layer.

The substrate travels along its path, away from the first application position 510*a*, to a first doctoring position 515*a*. At the doctoring position 515*a*, a doctoring blade 515 extends across the width of the substrate web 551. As above, the doctoring blade 515 is a strip of material, typically steel or plastic, which removes excess material from the surface of the substrate 551 as the substrate passes through the doctoring position 515*a*.

The now doctored substrate 551 with first material now exclusively in the recesses 552 continues to a curing position 518*a*. As the substrate passes through the curing position 518*a* the material in the recesses 552 is exposed to radiation from a UV light source 518 located above the surface of the substrate. As the material passes beneath this UV light source it is partially or fully cured such that its viscosity increases so it may be retained in the recesses 552.

The substrate 551 continues to the second material application system 520, located downstream of the first material application system. The second material application system is constructed identically to the first material application system, and applies a second material to the surface of the substrate web at a second material application position using a second offset roller 521 and applicator 522. The thickness of the second material applied to the surface of the substrate is such that the second material completes the filling of the recesses half-filled by the first material in accordance with step S1300.

The substrate travels along its path, away from the second application position 520*a*, to a second doctoring position 525*a*. At the doctoring position 525*a*, a doctoring blade 525 extends across the width of the substrate web 551. As above, the doctoring blade 525 is a strip of material, typically steel or plastic, which removes excess material from the surface of the substrate 551 as the substrate passes through the doctoring position 525*a*.

The now doctored substrate 551 with first and second layers of material in the recesses 552 continues to a curing position 528*a*. As the substrate passes through the curing position 528*a* the material in the recesses 552 is exposed to radiation from a UV light source 528 located above the surface of the substrate. As the material passes beneath this UV light source it is partially or fully cured such that its viscosity increases so it may be retained in the recesses 552.

The substrate web 551 continues to a sealing layer application position 530*a* at which a sealing layer application system 530 applies a sealing layer 550 in accordance with step S1400. The sealing layer application system comprises an offset roller 531 located above the substrate web, orientated across the direction of travel of the substrate web 551, for applying material to the surface of the substrate web that contains the recesses 352. A sealing material applicator 532 applies the sealing layer material to the offset roller 531 which rotates and transfers the sealing layer material to the surface of the substrate at the sealing layer application position 530*a*. In this embodiment, the sealing layer is optically clear, and hence allows the pattern to be visible from the upper surface of the substrate.

The substrate web, now containing cured material sealed in the recesses continues along the web path for further processing, for example, by application of focussing elements to form a security element on a security document.

Figure 13A:
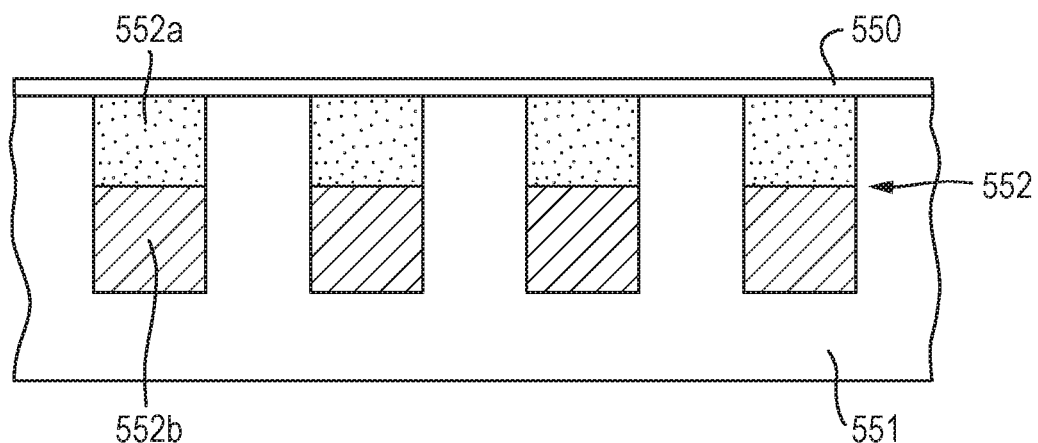
FIGS. 13A to 13C are schematic representations of the pattern elements formed using the apparatus of FIG. 12 in cross-sectional, top and bottom views respectively.
Figure 13B:
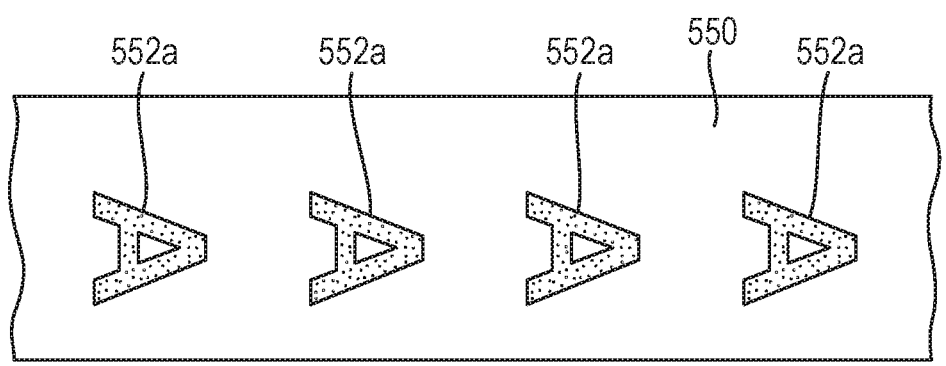
Figure 13C:
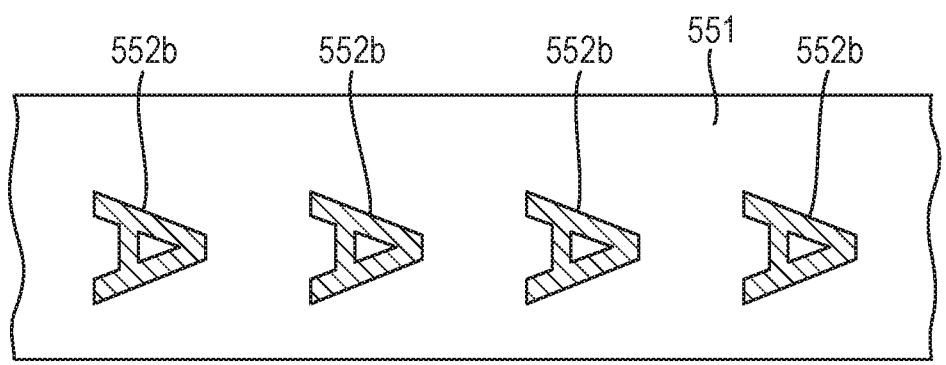

FIGS. 13A to 13C show a highly schematic example of the pattern elements formed by executing the method according to the second aspect of the present invention. FIG. 13A shows a cross-section through the substrate web 551, recesses 552 containing materials, and sealing layer 550. Each recess 552 contains a lower layer of material 552*b* in the bottom of the recess which is the first material applied by the first material application system. Each recess 552 further includes an upper layer of material 552*a*, which is the second material applied by the second material application system. FIG. 13B shows the pattern as it appears from an upper side of the substrate layer, through the optically clear sealing layer. In this view, only the upper layer 552*a* is visible, with the lower layer 552*b* obscured by the upper layer. The elements of the pattern therefore appear the colour of the upper layer material 552*a*. FIG. 13C shows the pattern as it appears from a lower side of the substrate layer 551, i.e. through the transparent substrate layer 551. In this view, only the lower layer 552*b* is visible, with the upper layer 552*a* obscured by the lower layer. The elements of the pattern therefore appear the colour of the lower layer material.

It will be appreciated that the different embodiments of forming a pattern according to the first aspect of the present invention have analogous embodiments in the second aspect of the present invention, which should be apparent based on the above teachings and are therefore not described in detail for conciseness.

The third aspect of the present invention will now be described with respect to the above, and with respect to FIGS. 15A and 15B.

Figure 15A:
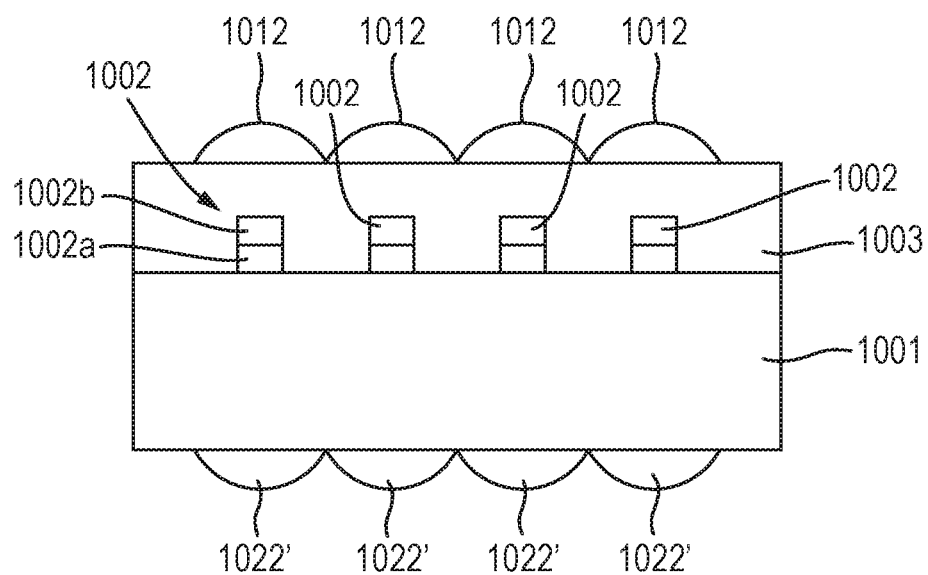
FIGS. 15A and 15B are cross-sectional views of security elements according to the third aspect of the present invention.

FIG. 15A shows a security element 1000, suitable for production using the method according to the first aspect of the present invention. The security element comprises a transparent pattern supporting layer 1001, which may be the pattern support layer of the first aspect, and an array of pattern elements 1002 on an upper surface of the pattern supporting layer, which could be formed by the recesses of the first aspect. The array of pattern elements are covered by an optical spacing layer 1003, and a corresponding first array of lenses 1112 sit on an upper surface of the optical spacing layer. A second array of lenses 1122 sits on the lower surface of the supporting layer.

Each pattern element 1002 comprises a lower layer 1002*a* of a first opaque, coloured material, and an upper layer 1002*b* of a second, opaque, coloured material.

As with the pattern shown in FIGS. 5A to 5C, the upper layer is visible from the top of the security element and obscures the lower layer, while the lower layer is visible from the bottom of the security element, and obscures the upper layer. In this security element, the arrange of lenses on both the upper surface of the optical spacer later 1003 and the lower side of the pattern supporting layer 1001 produce optical effects in different colours. For example, the upper lenses 1012 may display a moiré magnified first indicium in a first colour, which is the colour of the upper layer 1002*b*, while the lower lenses 1022 display a moiré magnified second indicium, which appears the same as the first indicium, (or a mirror image), in a second colour, which is the colour of the lower layer 1002*a*. Analogous effects may be achieved using lenses and image elements suitable for lenticular and integral imaging effects.

Figure 15B:
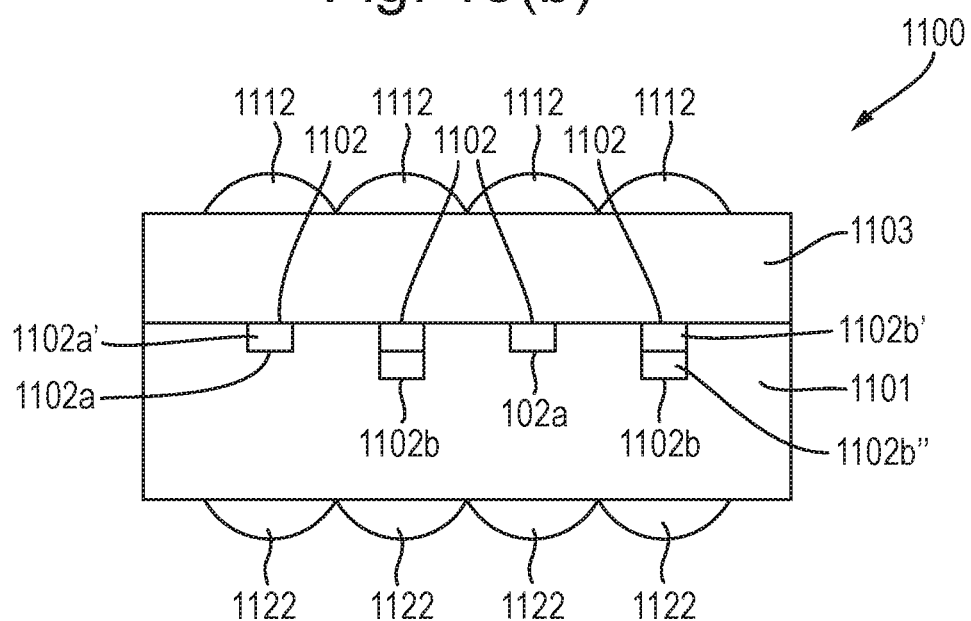

FIG. 15B shows a security element 1100, suitable for production using the method according to the second aspect of the present invention. The security element comprises a transparent pattern supporting layer 1101, which may be the substrate layer of the first aspect, and an array of pattern elements 1102 in a plurality of recesses in the pattern supporting layer. The array of pattern elements are covered by an optical spacing layer 1103, which could be the sealing layer of the second aspect, and a corresponding first array of lenses 1112 sit on an upper surface of the optical spacing layer. A second array of lenses 1122 sits on the lower surface of the pattern supporting layer.

A first set of pattern elements 1102*a* are formed in recesses of a first depth, and a second set of pattern elements 1102*b* are formed in recesses of a second depth, greater than the first depth. The first set of elements 1102*a* comprise only a layer of the first material 1102*a'* which fills their respective recesses, while the second set of elements comprise a lower layer 1102*b''* of the first material, and an upper layer 1102*b'* on top of the lower layer, the upper layer being of a second material.

In this embodiment, the first and second materials are substantially transparent with first and second coloured tints respectively. In this security element, the arrangement of lenses on both the upper surface of the optical spacer later 1103 and the lower side of the pattern supporting layer 1101 produce optical effects in which the colour tint of the first material is evident from the first set of elements 1102*a*, and the colour tints of the first and second materials combine and are evident from the second set of elements 1102*b*.

Although the figures shows a microlens array on both sides of the device to exploit the multilayer multi-coloured structure of the microimages, this is not necessary. In a simpler embodiment of FIG. 15A or 15B there could be a moiré magnified first indicium viewed from the top in a first colour and from the back the viewer could see a coarse image in a different colour created by the arrangement of microimages, for example the microimages could be placed in a pattern of a star.

It will be apparent that embodiments covered by the third aspect may be produced using any of embodiments of the methods of the first and second aspects, and we do not discuss all of these for conciseness.

The invention claimed is:

1. A method of applying a pattern formed of at least two different materials to a pattern support layer, the method comprising the steps of:
   a) providing a die form, the die form having a surface comprising a plurality of recesses defining the pattern;
   b) applying a first curable material to a first region of the surface of the die form such that the first curable material is received in at least some of the plurality of recesses in the first region and partially fills at least a first set of the plurality of recesses in the first region;
   c) applying a second curable material, different from the first curable material, to at least some of the first region of the surface of the die form such that the second curable material at least partially fills at least some of the first set of the plurality of recesses in the first region;
   d) bringing a pattern support layer in contact with the surface of the die form such that it covers at least some of the plurality of recesses containing both the first curable material and the second curable material;
   e) separating the pattern support layer from the surface of the die form such that the first curable material and the second curable material in the covered recesses is removed from the covered recesses and retained on the pattern support layer in accordance with the pattern; and
   curing, at least partly, the first and second curable materials, wherein the curing of the first and second curable material occurs in one or more steps during and/or after steps b) and c).

2. The method according to claim 1, further comprising the step of:
   b') removing from the surface of the die form substantially all of the first curable material not in the plurality of recesses in one or more steps after step b), but before step d).

3. The method according to claim 1, further comprising the step of:
   c') removing from the surface of the die form substantially all of the second curable material not in the plurality of recesses in one or more steps after step c), but before step d).

4. The method according to claim 1, wherein curing, at least partly, the first and second curable materials comprises:
   b") curing, at least partly, the first curable material after step b), but before step c); and
   c") curing, at least partly, the second curable material after step c), but before step d).

5. The method according to claim 1, further comprising steps of:
   after step b) and before step c):
      b') removing from the surface of the die form substantially all of the first curable material not in the plurality of recesses; and
      b") then curing, at least partly, the first curable material; and
   after step c):
      c') removing from the surface of the die form substantially all of the second curable material not in the plurality of recesses; and
      c") then curing, at least partly, the second curable material.

6. The method according to claim 1, wherein the first curable material only partially fills all of the plurality of recesses in the first region.

7. The method according to claim 1, wherein a first sub-group of the plurality of recesses have a first depth, and wherein a second sub-group of the plurality of recesses have a second depth, greater than the first depth.

8. The method according to claim 7, wherein the first curable material partially or substantially fills the plurality of recesses of the first sub-group in the first region, and partially fills the plurality of recesses of the second sub-group in the first region, and wherein the second curable material at least partially fills at least some of the plurality of recesses of the second sub-group in the first region and substantially does not fill the plurality of recesses of the first sub-group in the first region.

9. The method according to claim 7, wherein a third sub-group of the plurality of recesses have a third depth, greater than the second depth.

10. The method according to claim 1, wherein the pattern support layer is a curable pattern support layer, and wherein the method further comprises curing, at least partly, the curable pattern support layer in one or more steps after step d).

11. The method according to claim 10, wherein curing, at least partly, the curable pattern support layer also cures, at least partly, at least one of the first curable material and the second curable material.

12. The method according to claim 1, wherein the first curable material has a first set of optical properties, and wherein the second curable material has a second set of optical properties different from the first set of optical properties.

13. The method according to claim 1, further comprising the step of
d') bringing a substrate layer in contact with a first side of the pattern support layer, either before, during or after step d), the pattern support layer being retained on the substrate layer;
wherein the first curable material and second curable material are retained on a second side of the pattern support layer, the second side of the pattern support layer being opposite the first side of the pattern support layer.

14. The method according to claim 1, wherein the pattern support layer is a substrate layer suitable for use as a security document substrate.

15. A method of forming a pattern of at least two different materials in a substrate layer, the method comprising the steps of:
a) providing a substrate layer, the substrate layer having, on a first side of the substrate layer, a surface comprising a plurality of recesses defining the pattern;
b) applying a first material to a first region of the surface of the substrate layer such that the first material is received in at least some of the plurality of recesses in the first region and partially fills at least a first set of the plurality of recesses in the first region;
c) applying a second material, different from the first material, to at least some of the first region of the surface of the substrate layer such that second material at least partially fills at least some of the first set of the plurality of recesses in the first region;
d) securing the first material and the second material in the plurality of recesses such that the first material and/or the second material are optically detectable from the first side of the substrate layer or from a second side of the substrate layer opposite to the first side of the substrate layer, wherein the first material and the second material are curable, and wherein securing the first material and the second material in the plurality of recesses comprises curing, at least partially, the first material and curing, at least partially, the second material in one or more steps during or after step b).

16. The method according to claim 15, further comprising the step of:
b') removing from the surface of the substrate layer substantially all of the first material not in the plurality of recesses in one or more steps after step b), but before step d).

17. The method according to claim 15, further comprising the step of:
c') removing from the surface of the substrate layer substantially all of the second material not in the plurality of recesses in one or more steps after step c), but before step d).

18. The method according to claim 15, further comprising steps of:
after step b) and before step c):
b') removing from the surface of the substrate layer substantially all of the first material not in the plurality of recesses; and
after step c):
c') removing from the surface of the substrate layer substantially all of the second material not in the plurality of recesses.

19. The method according to claim 18, wherein steps b) and c) further comprise:
b") curing, at least partly, the first material after step b') but before step c); and
c) ii) curing, at least partly, the second material after step c' but before step d).

20. The method according to claim 15, wherein the first material only partially fills all of the plurality of recesses in the first region.

21. The method according to claim 15, wherein a first sub-group of the plurality of recesses have a first depth, and wherein a second sub-group of the plurality of recesses have a second depth, greater than the first depth.

22. The method according to claim 21, wherein the first material partially or substantially fills the plurality of recesses of the first sub-group in the first region, and partially fills the plurality of recesses of the second sub-group in the first region, and wherein the second material at least partially fills at least some of the plurality of recesses of the second sub-group in the first region and substantially does not fill the plurality of recesses of the first sub-group in the first region.

23. The method according to claim 15, wherein the first material has a first set of optical properties, and wherein the second material has a second set of optical properties different from the first set of optical properties.

24. The method according to claim 15, wherein step a) comprises:
a) i) providing a substrate layer, the substrate layer having, on a first side of the substrate layer, a surface; and
a) ii) forming in the surface a plurality of recesses defining the pattern.

25. A security element comprising the pattern support layer having a pattern formed of at least two different materials applied according to claim 1.

26. A security element comprising the substrate layer having a pattern of at least two different materials formed according to claim 15.

27. A security element comprising:
a pattern supporting layer having a first surface;
a pattern comprising an array of laterally distributed pattern elements on the first surface of the pattern supporting layer or in a plurality of recesses in the first surface of the pattern supporting layer; and a first array of lenses over the array of laterally distributed pattern elements, wherein
each pattern element of a first set of the pattern elements comprises
a first layer of a first cured material on the first surface of the pattern supporting layer or in a plurality of recesses in the first surface of the pattern supporting layer, and
a second layer of a second cured material, different from the first cured material, over the first layer of the first cured material;
a first sub-group of the pattern elements have a first height, and a second sub-group of the pattern elements have a second height, greater than the first height; and
the first array of lenses cooperates with the first sub-group of pattern elements and the second sub-group of pattern elements to form an image.

28. The security element according to claim 27, wherein each pattern element of a second set of the pattern elements comprises a layer of the first cured material and not a layer of the second cured material, or comprises a layer of the second cured material and not a layer of the first cured material.

* * * * *